(12) United States Patent
Lambertz et al.

(10) Patent No.: US 11,685,561 B2
(45) Date of Patent: Jun. 27, 2023

(54) DEVICE AND METHOD FOR MAKING A POUCH PROVIDED WITH A WRAPPING AND CONTAINING A BREWABLE MATERIAL

(71) Applicant: TEEPACK SPEZIALMASCHINEN GMBH & CO. KG, Meerbusch (DE)

(72) Inventors: Stefan Lambertz, Hürth (DE); Hans Knops, Krefeld (DE)

(73) Assignee: Teepack Spezialmaschinen GmbH & Co. KG, Meerbusch (DE)

(*) Notice: Subject to any disclaimer, the term of this patent is extended or adjusted under 35 U.S.C. 154(b) by 360 days.

(21) Appl. No.: 16/860,873

(22) Filed: Apr. 28, 2020

(65) Prior Publication Data

US 2020/0346796 A1 Nov. 5, 2020

(30) Foreign Application Priority Data

May 2, 2019 (EP) ..................... 19172261

(51) Int. Cl.
*B65B 11/02* (2006.01)
*B65B 29/02* (2006.01)
(Continued)

(52) U.S. Cl.
CPC .............. *B65B 11/02* (2013.01); *B65B 11/28* (2013.01); *B65B 11/48* (2013.01); *B65B 29/02* (2013.01);
(Continued)

(58) Field of Classification Search
CPC ......... B65B 11/02; B65B 11/28; B65B 11/48; B65B 29/02; B65B 29/04; B65B 29/028; B65B 41/12; B65B 45/00; B65B 51/16
(Continued)

(56) References Cited

U.S. PATENT DOCUMENTS 2,305,010 A 12/1942 Kenney et al.
2,334,256 A 11/1943 Eaton
(Continued)

FOREIGN PATENT DOCUMENTS

CA 2331652 A1 9/1991
CN 1362924 A 8/2002
(Continued)

OTHER PUBLICATIONS

Chinese Office Action issued in CN Application No. 202010362457.2 dated Jul. 6, 2021 (7 pages).
(Continued)

*Primary Examiner* — Dariush Seif
(74) *Attorney, Agent, or Firm* — Dorsey & Whitney LLP

(57) ABSTRACT

The present invention relates to a device for making a pouch received in a wrapping, comprising a pouch making device which is adapted to produce a pouch containing brewable material in a water-permeable wrapping, and comprising a sealing station with two sealing jaws movable relative to each other for sealing the pouch in a wrapping formed by a wrapping material. This device is characterized in that it comprises a pouch handling device for removing the finished pouch from the pouch making device and a wrapping material handling device for handling the wrapping material during the U-shaped wrapping of the wrapping material, wherein the handling device and the wrapping material handling device are adapted such that the pouch held by the pouch handling device and the wrapping material held by the wrapping material handling device are introduced into the sealing station.

8 Claims, 20 Drawing Sheets

(51) Int. Cl.
*B65B 41/12* (2006.01)
*B65B 11/28* (2006.01)
*B65B 11/48* (2006.01)
*B65B 29/04* (2006.01)
*B65B 45/00* (2006.01)

(52) U.S. Cl.
CPC .............. *B65B 29/04* (2013.01); *B65B 41/12* (2013.01); *B65B 45/00* (2013.01)

(58) Field of Classification Search
USPC .................................................. 53/413, 234
See application file for complete search history.

(56) References Cited

U.S. PATENT DOCUMENTS

| | | | |
|---|---|---|---|
| 2,348,201 A | 5/1944 | Barnett | |
| 2,362,459 A | 11/1944 | Barnett | |
| 2,385,229 A | 9/1945 | Patterson | |
| 2,433,176 A | 12/1947 | Epps et al. | |
| 2,481,554 A | 9/1949 | Winstead | |
| 2,529,732 A | 11/1950 | Howard | |
| 2,615,113 A | 10/1952 | Jack | |
| 2,629,809 A | 2/1953 | Frye | |
| 2,650,183 A | 8/1953 | Nicholas | |
| 2,823,502 A * | 2/1958 | Rambold | B65B 29/028 206/0.5 |
| 3,053,665 A * | 9/1962 | Irmscher | B65B 29/028 206/0.5 |
| 3,566,573 A * | 3/1971 | Irmscher | B65B 29/04 426/77 |
| 3,774,369 A * | 11/1973 | Klar | B65B 29/04 53/232 |
| 4,085,568 A * | 4/1978 | Focke | B65D 85/1018 53/383.1 |
| 4,495,745 A * | 1/1985 | Crescenzo | B65B 51/14 53/77 |
| 4,731,974 A * | 3/1988 | Billi | B65B 29/028 53/170 |
| 4,853,071 A * | 8/1989 | Romagnoli | B65B 11/40 53/134.2 |
| 4,885,896 A * | 12/1989 | Romagnoli | B65B 61/24 53/134.2 |
| 5,802,820 A * | 9/1998 | Romagnoli | B65B 61/24 53/529 |
| 5,852,917 A * | 12/1998 | Romagnoli | B65B 29/028 53/134.2 |
| 5,870,880 A * | 2/1999 | Romagnoli | B65B 29/04 53/134.2 |
| 5,893,256 A * | 4/1999 | Ghirlandi | B65B 29/04 53/134.2 |
| 6,141,944 A * | 11/2000 | Spatafora | B65B 19/225 53/579 |
| 6,499,273 B1 * | 12/2002 | Marzocchi | B65B 29/04 53/134.1 |
| 6,657,165 B1 | 12/2003 | Makutonin et al. | |
| 6,675,553 B2 * | 1/2004 | Lohrey | B65B 35/52 53/247 |
| 6,948,292 B2 * | 9/2005 | Romagnoli | B65B 29/04 53/134.2 |
| 8,202,079 B2 | 6/2012 | Litzenberg et al. | |
| 10,640,251 B2 | 5/2020 | Campagnoli | |
| 10,765,562 B2 | 9/2020 | Piantoni et al. | |
| 11,299,304 B2 * | 4/2022 | Lambertz | B65B 35/26 |
| 2002/0117248 A1 | 8/2002 | Basque | |
| 2002/0139086 A1 * | 10/2002 | Ghirlandi | B65B 29/028 53/413 |
| 2002/0139087 A1 * | 10/2002 | Ghirlandi | B65B 29/028 53/413 |
| 2004/0226263 A1 * | 11/2004 | Romagnoli | B65B 29/028 53/550 |
| 2011/0232229 A1 * | 9/2011 | Rea | B29C 66/849 53/167 |
| 2012/0085749 A1 | 4/2012 | Wheeler | |
| 2013/0105279 A1 | 5/2013 | Ramirez | |
| 2017/0233120 A1 * | 8/2017 | Spatafora | B65B 61/06 53/134.2 |
| 2017/0240306 A1 * | 8/2017 | Spatafora | B65D 85/808 |
| 2019/0071199 A1 | 3/2019 | Cassoli et al. | |
| 2020/0346798 A1 * | 11/2020 | Lambertz | B29C 65/18 |
| 2022/0063852 A1 * | 3/2022 | Rydlewski | B29C 66/91651 |

FOREIGN PATENT DOCUMENTS

| | | | |
|---|---|---|---|
| CN | 1483645 A | 3/2004 | |
| CN | 1556010 A | 12/2004 | |
| CN | 103402875 A | 11/2013 | |
| CN | 104245533 A | 12/2014 | |
| CN | 105329693 A | 2/2016 | |
| CN | 107074384 A | 8/2017 | |
| CN | 107521760 A | 12/2017 | |
| CN | 107848644 A | 3/2018 | |
| CN | 208199001 U | 12/2018 | |
| CN | 109641703 A | 4/2019 | |
| CN | 208790071 U | 4/2019 | |
| CN | 210618667 U | 5/2020 | |
| DE | 3837118 A1 | 5/1990 | |
| DE | 102007011060 A1 | 9/2008 | |
| DE | 102018101570 A1 * | 7/2019 | ............ B65B 29/04 |
| EP | 1268161 A1 | 1/2003 | |
| EP | 1384664 A1 | 1/2004 | |
| EP | 1795331 A1 | 6/2007 | |
| EP | 1871670 A2 | 1/2008 | |
| EP | 1731295 B1 | 3/2008 | |
| EP | 2231479 B1 | 8/2011 | |
| EP | 2681119 B1 | 12/2014 | |
| EP | 3578483 A1 | 12/2019 | |
| JP | S49012259 U | 2/1974 | |
| JP | S53158761 U | 12/1978 | |
| JP | 55-60292 | 5/1980 | |
| JP | S55060292 A | 5/1980 | |
| JP | S55124979 A | 9/1980 | |
| JP | S57149797 A | 9/1982 | |
| JP | S59-54293 U | 4/1984 | |
| JP | S63-107542 | 7/1988 | |
| JP | 2011079581 A | 4/2011 | |
| JP | 2011246199 A | 12/2011 | |
| JP | 2012511481 A | 5/2012 | |
| JP | 2017114537 A | 6/2017 | |
| WO | WO-0017055 A2 * | 3/2000 | ............ B65B 29/04 |
| WO | 2001/62600 A1 | 8/2001 | |
| WO | 0237897 A1 | 5/2002 | |
| WO | 2009101686 A1 | 8/2009 | |
| WO | 2010013206 A2 | 2/2010 | |
| WO | 2012/117308 A1 | 9/2012 | |
| WO | 2012117308 A1 | 9/2012 | |
| WO | WO-2012117308 A1 * | 9/2012 | ............ B65B 11/28 |
| WO | WO-2018015917 A1 * | 1/2018 | ............ B65B 11/38 |

OTHER PUBLICATIONS

Chinese Office Action issued in CN Application No. 202010372142.6 dated Jul. 15, 2021 (8 pages).
European Search Report issued in European Patent Application No. 20193603 dated Feb. 10, 2021 (2 pages).
Japanese Office Action issued in JP Application No. 2020-081014 dated Jul. 16, 2021 (4 pages).
English translation of Japanese Office Action issued in JP Application No. 2021-141170 dated Nov. 4, 2021 (4 pages).
Japanese Office Action issued in JP Application No. 2020-081017 dated Oct. 8, 2021 (7 pages).
European Search Report issued in EP Patent Application No. 20171836.8 dated Sep. 10, 2020 (10 pages).
Extended European Search Report dated Jan. 13, 2020 in European Patent Application No. 19172261.0 (10 pages).
Japanese Office Action and Translation for Japanese Patent Application No. 2021-141170, dated Mar. 18, 2022.

(56) References Cited

OTHER PUBLICATIONS

"CN Office Action from Related Matter 202111005431.3", dated Nov. 25, 2022, 8 pgs.

* cited by examiner

DEVICE AND METHOD FOR MAKING A POUCH PROVIDED WITH A WRAPPING AND CONTAINING A BREWABLE MATERIAL

FIELD

The present invention relates to a method and a device for making a packaging unit comprising a pouch which contains brewable material and which is provided in a wrapping, for example an aroma-tight wrapping.

CROSS REFERENCE TO RELATED APPLICATIONS

This application claims benefit of priority pursuant to 35 U.S.C. § 119(a) of European patent application no. 19172261.0 filed May 2, 2019, which is hereby incorporated herein by reference in its entirety.

BACKGROUND

EP 2 231 479 B1 can be regarded as generic with respect to the device and the method. With this state of the art, infusion pouches are first produced in a pouch production unit. The result of this intermediate step is an infusion pouch, i.e. a pouch in which brewable material is enclosed, wherein the pouch itself is usually connected by a thread which is provided with a label at its end opposite the pouch. According to the state of the art, this intermediate product is transferred to a wrapping station, where a web of a film forming the wrapping is provided, onto which the pouch is placed in order to pivot a length piece of the film projecting beyond the pouch over the pouch so that the pouch is positioned between opposite legs of the film forming the wrapping material. Insofar as the present invention refers to a U-shape, this term is not to be understood as identical in meaning. The main point is that the pouch is held between opposite legs of the wrapping material which are connected by a common edge or fold formed by the film material. It is not important whether the edge of the wrapping material is U-shaped, V-shaped or otherwise.

After in the state of the art the pouch having been placed between the opposite legs of the wrapping material in this way, after a piece of film has been separated from a continuously fed film web, the unit consisting of U-shaped folded film and pouch is fed to a sealing station where the side edges of the opposite legs that are not yet connected to each other and project beyond the pouch are joined together. This sealing takes place—as in the present invention—for example by heat sealing, i.e. welding or knurling.

In an alternative procedure known from WO 01/62600 A1, the pouch is first pulled out of the pouch making unit. As with the previously discussed state of the art, the pouch making unit also has a carousel with several receptacles adapted to hold pouches. In such a receptacle, the pouch is pushed back together with the wrapping material to wrap the pouch in a U-shaped wrapping so that the opposite legs of the wrapping material enclose the pouch between them. The pouch is then finally removed from the pouch making unit. The unit of U-shaped film and pouch is transferred to a sealing station. There, the wrapping is closed by sealing in the manner described above.

The underlying problem of the present invention is to provide a more economic and efficient production of a pouch contained in a wrapping. For this purpose, it aims to define a suitable device and a corresponding method of production.

BRIEF SUMMARY OF THE DISCLOSURE

With respect to the solution of the problem based on a device, the present invention proposes a device having the features of claim 1.

This device has a pouch handling device for removing the finished pouch from the pouch making device. Furthermore, a wrapping material handling device is provided for handling the wrapping material during the U-shaped wrapping of the wrapping material web. The pouch handling device and the wrapping material handling device are configured according to the invention in such a way that the pouch held by the pouch handling device and the wrapping material held by the wrapping material handling device are transferred between the sealing jaws of the sealing station.

According to the present invention, two handling devices are accordingly realized, each of which is associated with the two components of the wrapped pouch, wherein the pouch handling device generally handles the pouch exclusively and the wrapping material handling device generally interacts exclusively with the wrapping material. The interaction of the two handling devices takes place when the wrapping material and the pouch are introduced into the sealing station. The handling devices bring the two components of the finished packaging, i.e. the wrapping and the pouch, separately and independently of each other into the sealing station, i.e. between the sealing jaws.

The two handling devices accordingly enable the two components to be handled independently of each other, so that, for example, when feeding the components, the wrapping material and the pouch can be positioned relative to each other and, if necessary, the wrapping material web can be transformed when inserted between the sealing jaws. The present invention specifically dispenses with a separate wrapping station in which the finished pouch is placed between the U-shaped legs of the film as wrapping material by placing it on an initially flat film web and folding over a free end of the film to form the legs.

Rather, the wrapping material can be formed into a U-shape when fed and introduced into the sealing station. For this purpose, the wrapping material handling device usually grips the wrapping material in a central area. During this gripping, the wrapping material extends essentially flat. The central area usually lies on a movement path which the finished pouch travels as the pouch is moved out of the pouch making device. This movement path is continuous, preferably substantially linear, between the pouch making device, specifically the station of the pouch making device where the finished pouch is discharged from the pouch making device, and the next processing station, i.e. those sealing jaws which are open to receive the pouch together with the wrapping material. The pouch making device and the sealing station are therefore essentially directly adjacent to one another. The finished pouch is transferred directly from the pouch making device to the sealing station without further processing. The joining of the wrapping material and the pouch, in particular the wrapping of the pouch between the legs of the U-shaped bent wrapping material is only carried out during the insertion into the sealing station. Accordingly, the pouch does not approach the wrapping material for wrapping into it until the pouch has already been introduced into the sealing station, namely into its opened sealing jaws.

The pouch handling device and the wrapping material handling device are not only devices for joining pouches and wrapping material. They are also handling devices for inserting the two components between the sealing jaws of the sealing station. Thereby, they effect the wrapping of the pouch and the insertion of pouch and wrapping material between the sealing jaws in one.

This makes it possible to simplify the device for producing a pouch contained in a wrapping.

With regard to the previously described procedural method, in which the wrapping material is gripped by the wrapping material handling device and introduced into the sealing station, a wrapping material feeding device is proposed in accordance with a preferred further development of the present invention, which holds a length piece of the wrapping material between the finished pouches located in the pouch making device and the sealing station. The length piece can still be provided as a section of a basically endlessly fed wrapping material web and can only be cut off after it has been transferred to the sealing station. However, the length piece can also be fed with its final length, for example the length forming the wrapping. The wrapping material portion is usually intended to extend transversely to the movement path of the pouch, which the pouch follows on its way between the pouch making device and the sealing station.

The wrapping material portion is usually cut off from a continuous supply of wrapping material when the wrapping material handling device grips the wrapping material. This ensures that until the predetermined length piece is cut off, it can be handled as part of a continuum. Thereby, when gripped by the wrapping material handling device, the length piece of the wrapping material is normally held in lateral guide rails which are open in the central area of the length piece of the wrapping material so that the wrapping material handling device can engage there and pull the length piece of the wrapping material out of the guide. The guide is generally provided with funnel-shaped areas tapering towards the sealing station, over which the web of the wrapping material, which is initially fed in a substantially flat and straight line, is reshaped, i.e. folded, when it is fed to the sealing station.

This movement path can be straight line or circle-segment-shaped. It is usually steady. The pouch is continuously and/or without further processing guided on this movement path or moved continuously.

In the device according to the invention, the joining of pouch and wrapping material takes place when both components are inserted between the sealing jaws. Since there is no common handling device for the unit of pouch and wrapping material and in view of the sealing between the sealing jaws, a clamping device associated with the sealing station is proposed according to a preferred further development of the present invention. This clamping device usually has at least one clamping element movable relative to one of the sealing jaws. Preferably, each of the two sealing jaws has a corresponding clamping device for sealing the pouch between the wrapping, wherein each individual clamping device is preferably movable relative to the associated sealing jaw. This allows the clamping device to hold the pouch together with the U-shaped wrapping material enclosing the pouch between the sealing jaws before closing the sealing jaws.

In one conceivable configuration, the pouch is positioned relative to the wrapping material in such a way that the opposite edges of the wrapping material project beyond the pouch. The pouch may lie directly against the edge/fold of the wrapping material. The edges of the wrapping material which project beyond the pouch and are not yet joined together when the pouch and wrapping material assembly is inserted are placed between the normally U-shaped sealing jaws. These usually have in their interior one or more clamping devices which act on the unit in the central area in order to hold the pouch together with the wrapping material in the sealing station and to position it in the desired manner so that the edges to be sealed come between the functional surfaces of the sealing jaws.

In the procedure already outlined above, initially the pouch containing a brewable material is produced. This is placed between opposite legs of the wrapping material. The legs are joined together in a sealing station to form the wrapping surrounding the pouch. The legs are formed by forming the wrapping material into a U-shape. The wrap can be effected in a central area of the wrapping material. Thus, the edge or fold of the wrapping material is located between legs of the wrapping material of approximately equal length. The two legs are formed when the wrapping material is brought into the sealing station. Accordingly, the length pieces opposite each other and separated and connected by the later edge or fold do not approach each other until they are brought into the sealing station.

According to a preferred further development of the method according to the invention, the central area of the wrapping material is moved transversely to the longitudinal extension of the same towards the sealing station. Thus, prior to being handled by the wrapping material handling device, the generally planar wrapping material typically extends tangentially to a sealing station with pairs of sealing jaws rotating about a common axis of rotation, or tangentially to a carousel which can form the essential component of the pouch making device and which has various receptacles for the pouch.

According to a preferred method, the wrapping material and the pouch are moved relative to each other along the movement path when they are brought into the sealing station. This means that the speed of the two components on said path is not necessarily synchronized until the wrapping material and pouch are completely inserted between the sealing jaws. The relative movement mentioned above does not mean the pivoting of the individual legs of the wrapping material relative to the pouch. Rather, it means a relative movement of the edge or fold being formed relative to a mass point of the pouch. With increasing movement of the pouch and the wrapping material and approach to the sealing station, the pouch and the wrapping material are brought closer together. Preferably, the wrapping material is already moved towards the sealing station while the pouch is still in the pouch making device. In other words, not only is the wrapping material formed into a U-shape when it is brought into the sealing station. Rather, the pouch and the wrapping material are also combined on the way to the sealing station so that their final relative position to each other is only reached during insertion, and possibly also only at the end of the insertion movement into the sealing station, irrespective of any pivoting movement of the legs that may still have to be performed.

In a method relatively easy to control, which is described according to a preferred aspect of the present invention, the wrapping material is moved in front of the pouch when the pouch is introduced into the sealing station. Accordingly, the edge or fold lies in front of the pouch in the direction of movement of the pouch towards the sealing station. As a result, the opening of the U-shaped wrapping material points outwards, making it easier to advance the pouch between the legs of the wrapping material. As part of this movement, the sections forming the legs act against forming elements, which may be arranged on a guide holding the wrapping material, for example, and move the legs towards each other around the fold.

In the method according to the invention and the device according to the invention, the pouch on the one hand and the wrapping material on the other hand are preferably fixed by clamping. In accordance therewith, the pouch handling device has means for clamping the finished pouch. The wrapping material handling device also has means for clamping the pouch material in order to temporarily fix it to the pouch material handling device and in this way to transfer it fixedly between the sealing jaws via the handling device. The wrapping material handling device preferably has a leading and a trailing wrapping material handling element. The two wrapping material handling elements are configured such that they can be moved towards and away from each other by relative movement, whereby the two wrapping material handling elements can clamp the wrapping material between them at maximum approach and accordingly carry it along when the leading and trailing wrapping material handling elements are moved towards the sealing jaws in synchronism with the introduction of the wrapping material between the sealing jaws.

However, in a preferred method of the present invention, the trailing wrapping material handling element is moved in the opposite direction after the wrapping material has been introduced between the sealing jaws so that the trailing wrapping material handling element is arranged outside the sealing jaws before the sealing jaws are closed. However, for the sake of rapid processing, the leading wrapping material handling element remains at the level of the sealing jaws when the sealing jaws are closed and is moved together with the pouch in the direction of the wrapping material feeding device only after the wrapping material has been completely picked up, in order to grip the next length piece of wrapping material by clamping and guide it between the sealing jaws.

Due to this method, the leading wrapping material handling element can still be used to fix the wrapping material between the sealing jaws until the sealing jaws are completely closed.

Overall, the solution according to the invention offers a faster and accordingly economically feasible process and a device suitable for carrying out the method. The solution dispenses with a wrapping station, in which first the unit of U-shaped folded wrapping material with the pouch arranged in between is formed, which unit is accordingly placed between the sealing jaws. Thus, the device according to the invention manages with a smaller number of device elements for the production of a pouch provided with a wrapping. Since there is no wrapping station at all, the number of stations through which the individual components must pass until the packaging unit consisting of wrapping and pouch is completed is also reduced. This results in a faster and therefore more economical production of the packaging unit.

As in the prior art, the wrapping in the context of the present invention may be formed by a film which provides an aroma-tight wrapping around the pouch. However, the wrapping may be made of another material which provides a certain protection of the pouch, for example to protect the pouch as a foodstuff from direct contact by third parties until the wrapping is opened and the pouch is removed. The wrapping material can also be paper, gauze or a perforated film.

In the case of a wrapping made of plastic film, sealing may be effected by welding the two layers of wrapping material together. A per se non-sealable wrapping material may be provided with a sealable coating or a sealable strip at the point where the welding for sealing is to take place. Sealing may also be achieved by knurling or embossing or other joining techniques to join two layers.

BRIEF DESCRIPTION OF THE DRAWINGS

The present invention is explained in more detail below by means of an embodiment in conjunction with the drawing. The corresponding description illustrates further details, features and advantages of the present invention. In the drawing.

DETAILED DESCRIPTION

Figure 1:
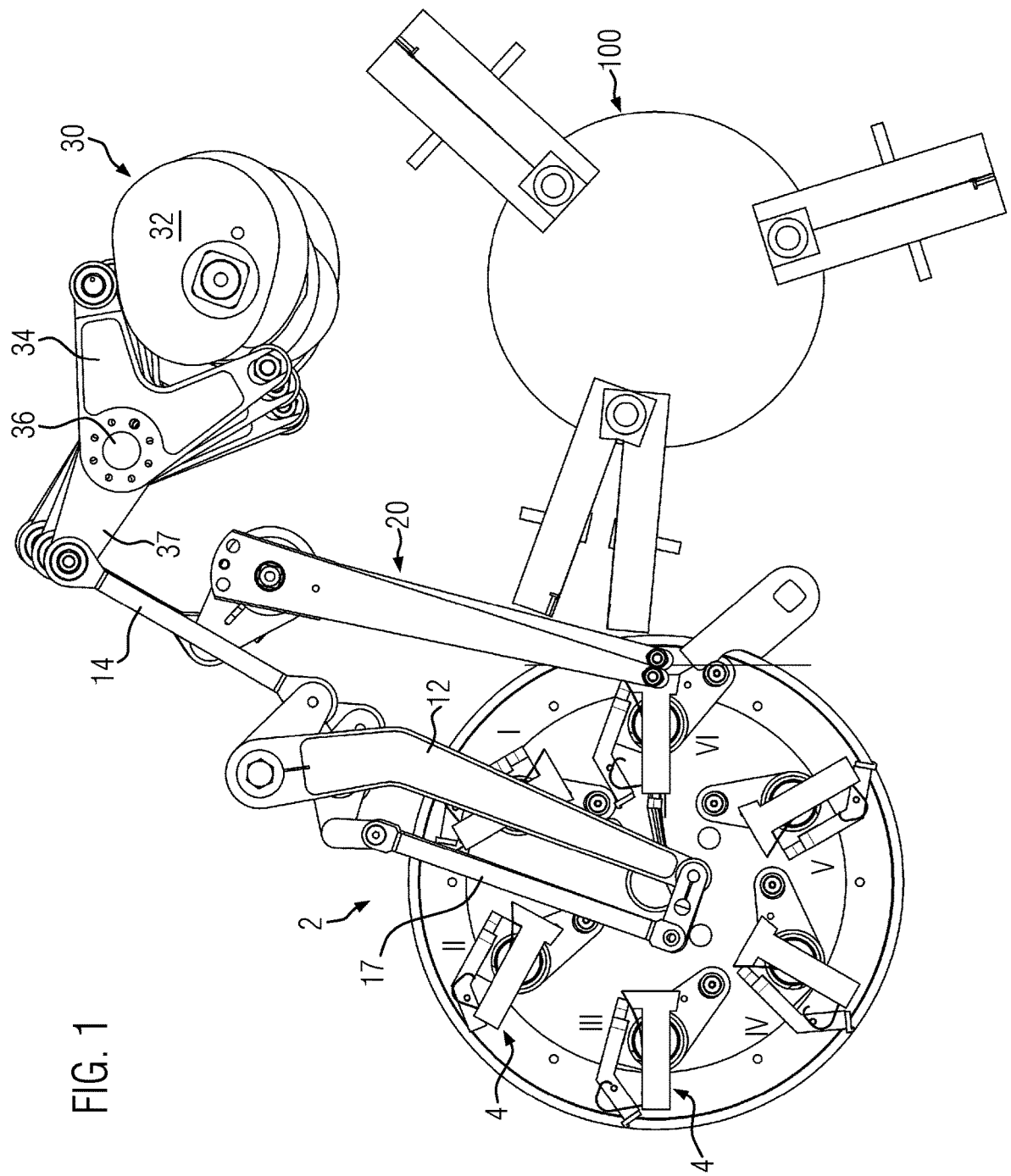
FIG. 1 shows a side view of essential parts of an embodiment for the production of a wrapped pouch.

The embodiment shown in FIG. 1 comprises a pouch making device identified by reference sign 2 and a sealing station identified by reference sign 100.

The pouch making device 2 comprises a carousel with several receptacles 4 rotating about an axis for receiving a water-permeable wrapping, which is reshaped to form the pouch, containing a brewable material and is usually connected with a thread and a label. With regard to the individual stations and their configuration, reference can be made to the state of the art, for example EP 2 231 479 B1 or WO 01/62600 A1. The reference signs I to VI in FIG. 2 indicate different positions in which the receptacle 4 can be located in order to receive and process the different components of the finished pouch or pouch to be finished. For reasons of clarity, elements acting on these are not shown. In position VI, the pouch is finished.

Figure 2:
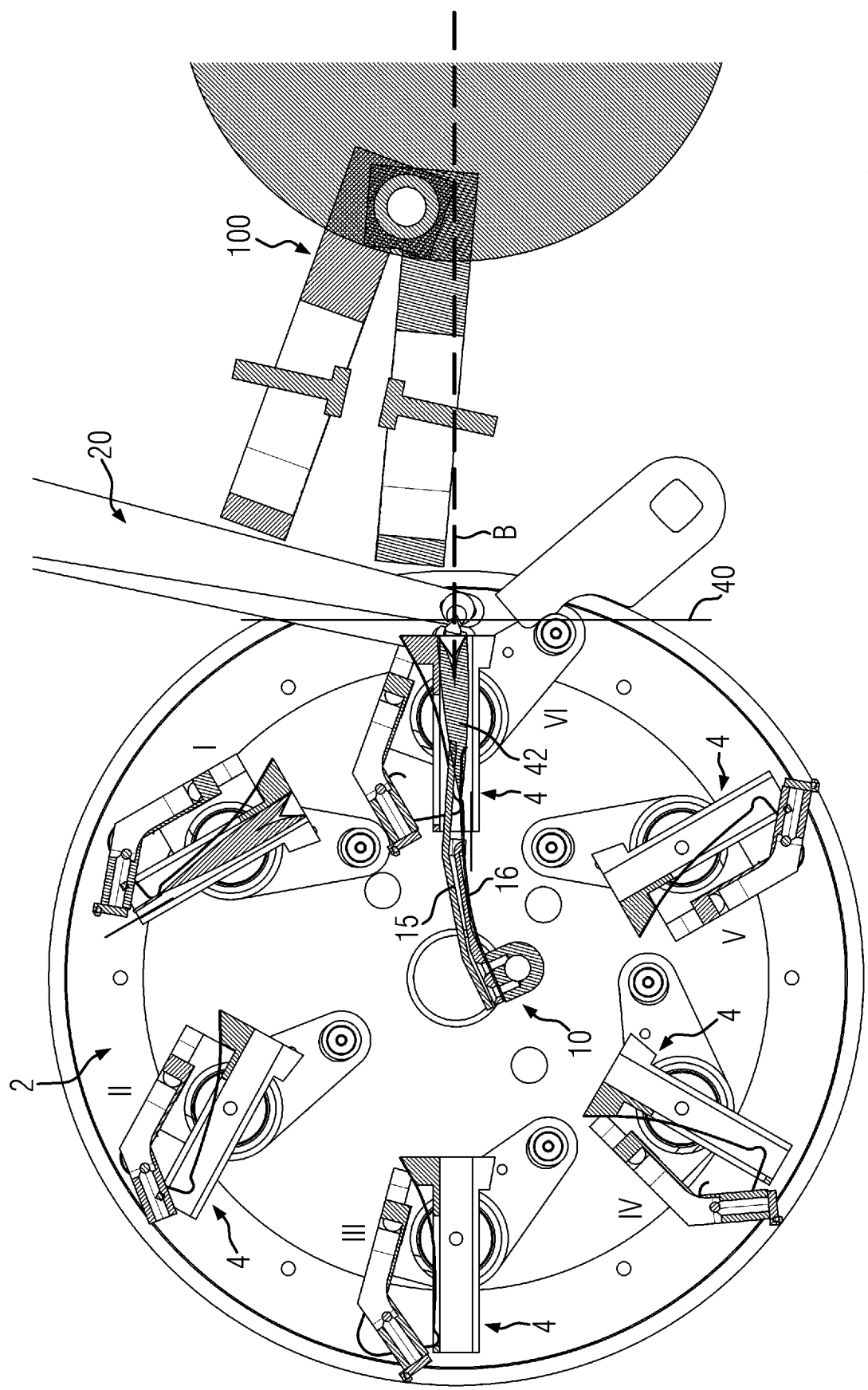
FIG. 2 shows the side view according to FIG. 1 in enlarged view.
Figure 3:
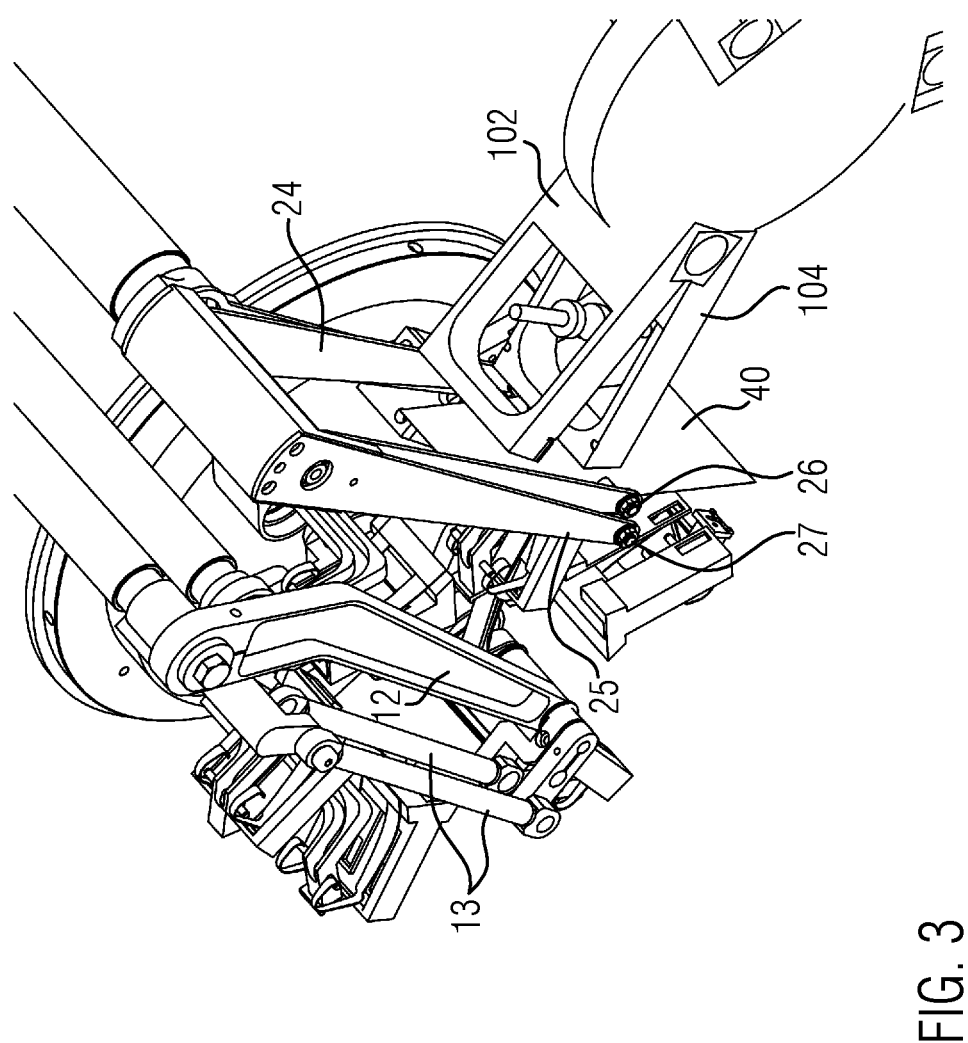
FIG. 3 shows the starting position of the embodiment shown in FIGS. 1 and 2 in a perspective side view.

FIGS. 1 to 3 show elements of a pouch handling device identified by reference sign 10 and a wrapping material handling device identified by reference sign 20. The wrapping material of the embodiment shown is an aroma-tight film. Thus, the description below refers to a film handling device 20. The pouch handling device 10 comprises two approximately parallel arms 12, 13, which are hinged together and coupled by coupling rods 14 to a common drive device 30. This common drive device 30 has various cams 32, which are mounted non-rotatably on a common drive shaft 33 of the drive device 30 and are coupled to collectors 34, in which the outer circumferential surfaces of the cams 32 each roll, wherein the collectors 34 are each pivotally mounted on a common bearing axis 36 and are provided with a lever 37, which is hinged to the associated coupling rod 14. The coupling rods 14 act via levers on the arms 12.

The drive shaft 30 actuates both the individual components of the pouch handling device 10 as well as the components of the film handling device 20. Thus, both handling devices 10, 20 are provided with a common drive and are positively synchronized.

First sealing jaws 102 and second sealing jaws 104 are assigned to the sealing station 100. Details of the sealing station will be explained with reference to FIGS. 5 to 7. For the following description with reference to FIGS. 1 to 4, the function of the sealing jaws 102, 104 is only relevant in so far as the two sealing jaws 102, 104 can be moved relative to each other and applied to each other for sealing the pouch in a film wrapping and can be pivoted in the opposite direction to release the sealed pouch or to take up a new pouch with the film, wherein the sealing jaws 102, 104 provided in pairs can be pivoted about a common axis. FIGS. 1 to 4 show the sealing station 100 only schematically. However, the actual configuration of the embodiment deviates from this and can be seen in FIGS. 5 to 7.

As FIG. 3 illustrates, the film handling device 20 has a leading film handling element identified by reference sign 21 and a trailing film handling element identified by reference sign 22, each of the elements 21, 22 having film handling arms 24 and 22 respectively provided in pairs. 25, wherein each pair is pivotally mounted and independently drivable and each has inwardly projecting clamping projections, wherein the clamping projection of the leading handling arms 24 is identified with reference sign 26 and that of the trailing handling arms 25 is identified with reference sign 27.

The arms of the pouch handling device 10 are designed as a front pouch handling arm 12, which carries a clamping shoe 15, and as a rear pouch handling arm 13, which actuates a clamping spring 16 which interacts with the clamping shoe 15 and which is pivotable relative to the clamping shoe 15. These elements are described in detail in FIG. 5 et seq. A further actuating arm 17 pivots the clamping shoe 15 relative to the front pouch handling arm 12.

FIG. 3 shows a wrapping material 40 in the form of a film which is fed tangentially with respect to the rotation axes of the pouch making device 2 and the sealing station 100 as a planar path and which is clamped in the phase according to FIG. 3 between the leading clamping projection 26 and the trailing clamping projection 27 by relative pivoting movement of the two handling arms 24, 25 relative to each other. This position represents the starting position for inserting the film 40 between the two sealing jaws 102, 104. It is shown in a corresponding manner in FIG. 2, in which a pouch to be placed between the sealing jaws 102, 104 is identified with reference sign 42. The arms 12, 13, 17 are omitted for reasons of representation.

The film 40 is obviously clamped and gripped in its central area between the two leading and trailing clamping projections 26, 27. In this phase, the clamping shoe 15 with the clamping spring 16 is inserted into the corresponding receptacle 4 to grip the pouch 42. The two sealing jaws 102, 104 do not yet enclose between them a movement path of the film 40 and the pouch 42 identified by reference sign B. In fact, the two sealing jaws 102, 104 are located above this movement path B. This movement path B runs essentially as a radial line which intersects the pivot point of the carousel of the pouch making device 2. The movement path B extends in a straight line between the pouch making device 2 and the sealing station 10.

Figure 4A:
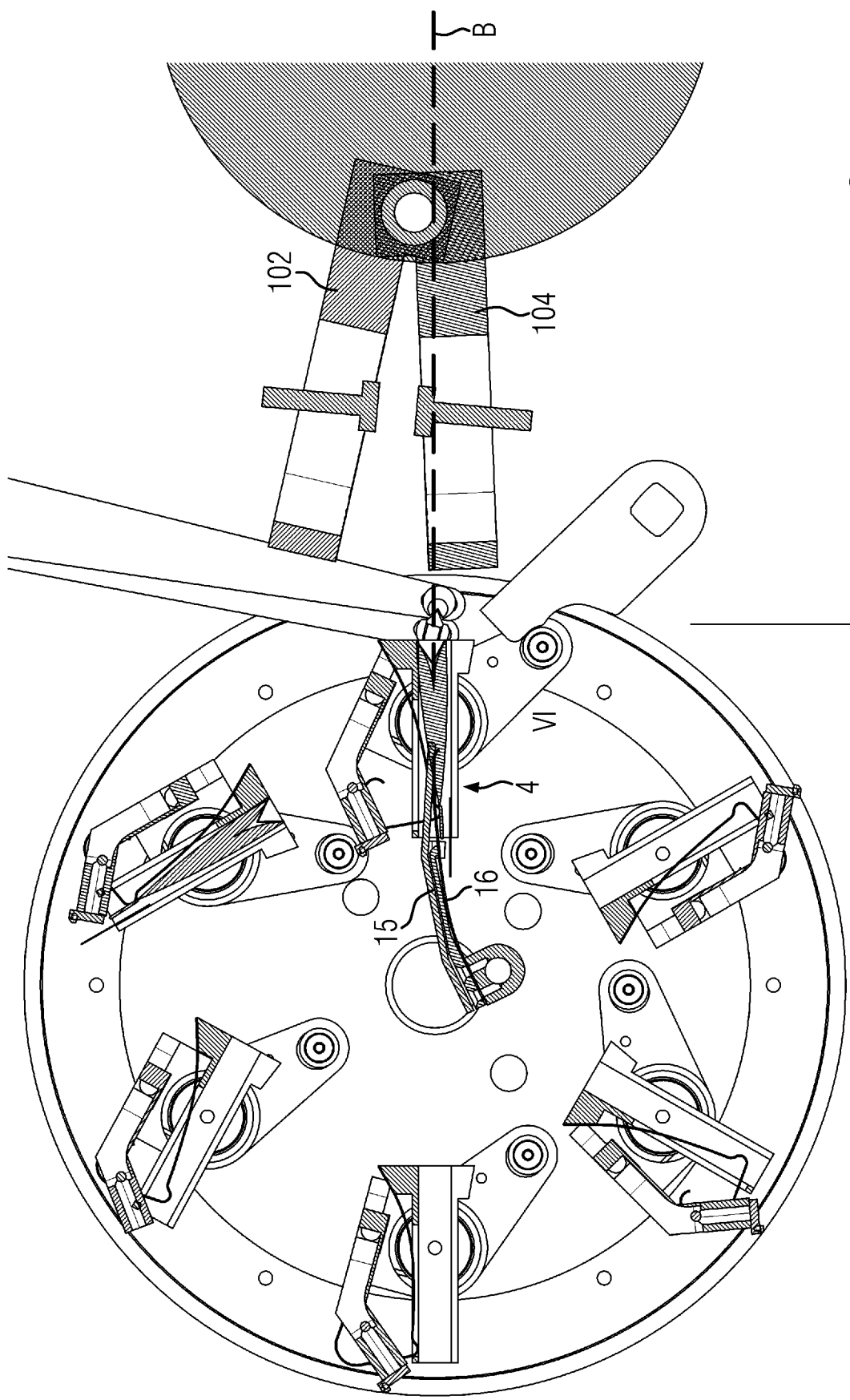
FIGS. 4a-4n show different phases in the operation of the embodiment in side views or perspective side views according to FIGS. 2 and 3.
Figure 4B:
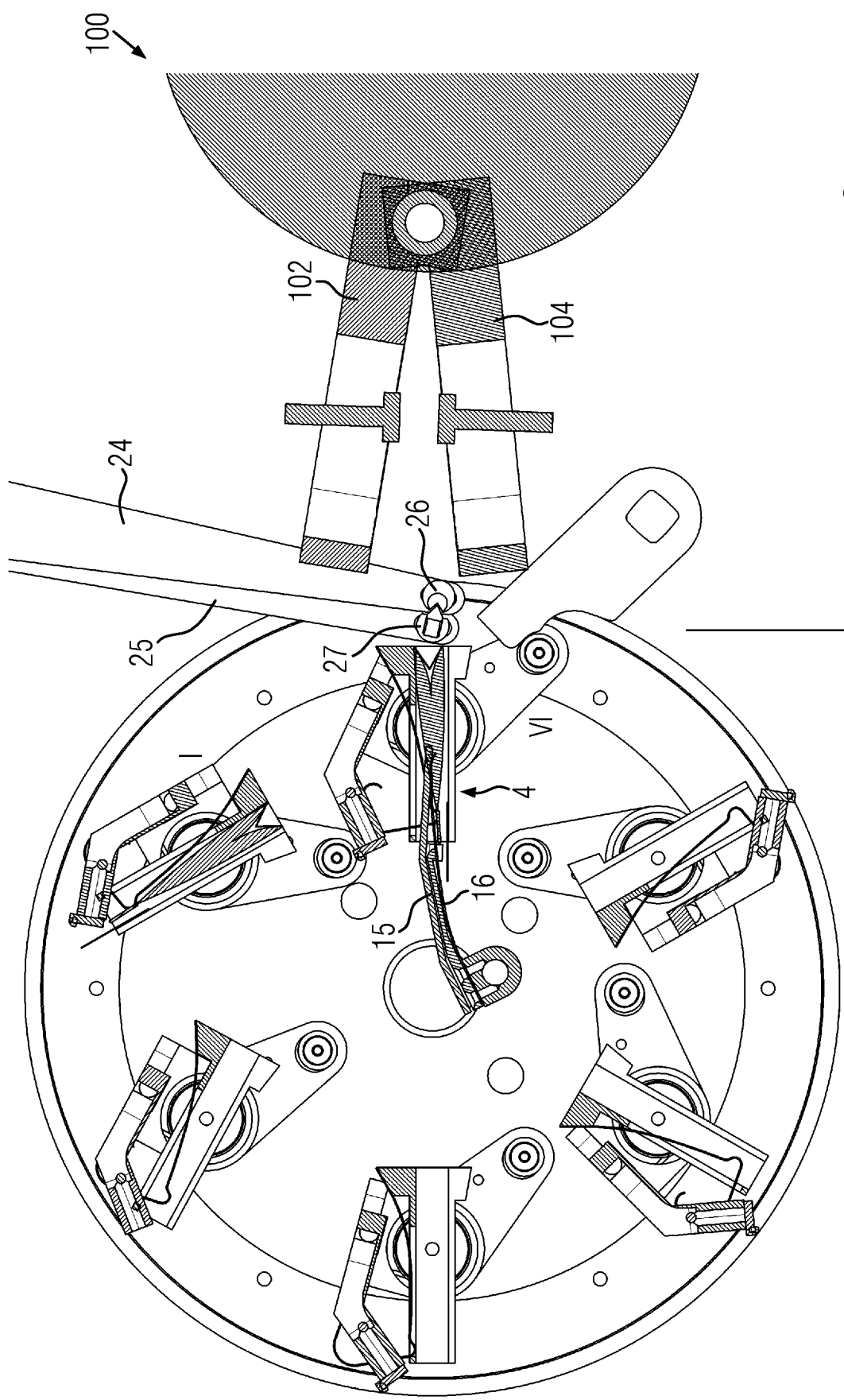
Figure 4C:
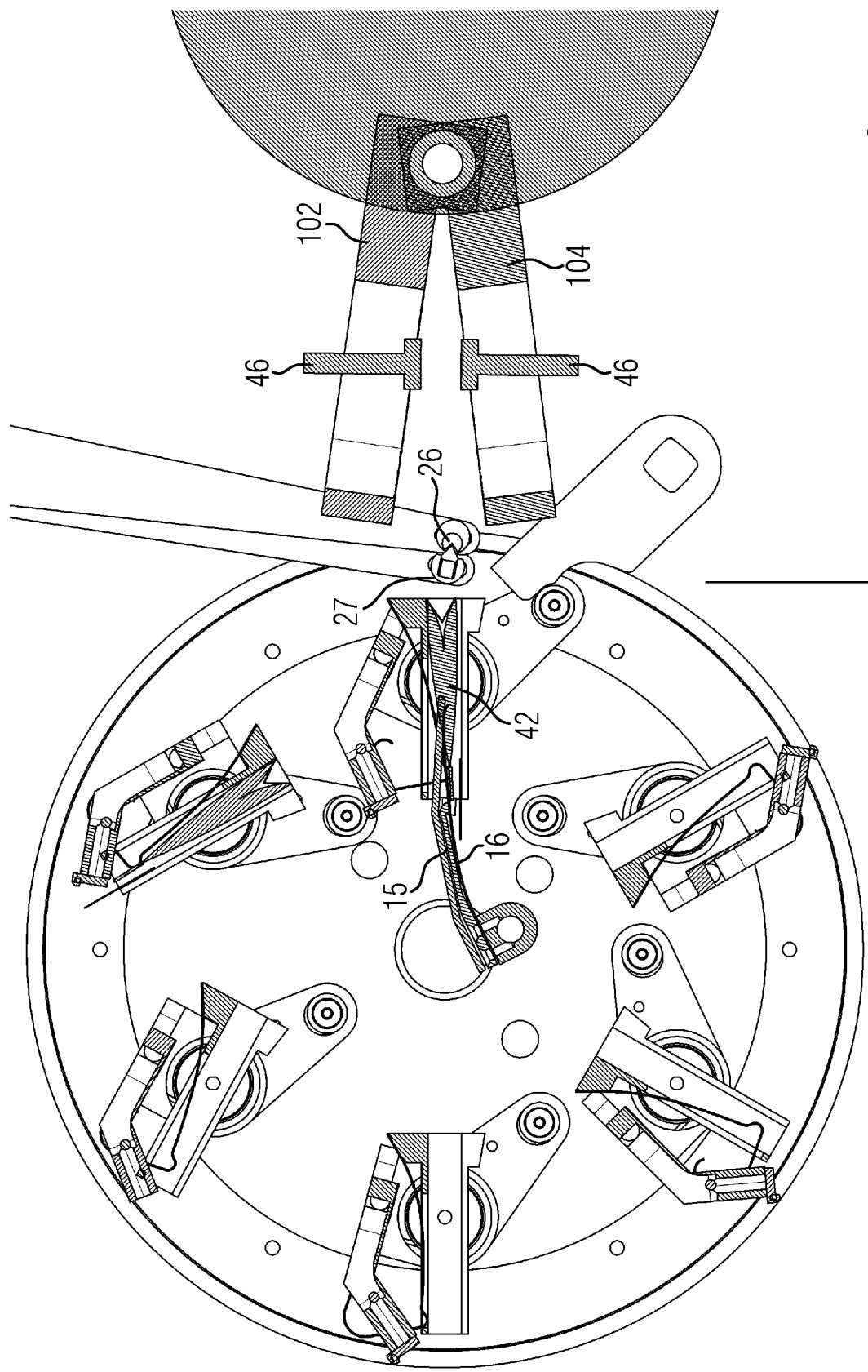

In the phase shown in FIG. 4a, the two handling arms 24, 25 have already been pivoted towards the sealing station 100, carrying the film 40 with them. To a lesser extent, the clamping shoe 15 and the clamping spring 16 have been advanced into the receptacle 4. In the sequence between FIGS. 4b and 4a, the clamping spring 16 was pivoted to clamp the pouch 42 between the clamping shoe 15 and the clamping spring 16 while the clamping shoe remains in the receptacle. The carousel of the pouch making device 2 remains stationary. The same arises for FIG. 4c, which clearly shows in comparison to FIG. 4b that the film 40 has already advanced a certain distance along the movement path B towards the sealing station 100, whereas the pouch 42 remains in its receptacle 4. Accordingly, the film 40 leads the pouch 42.

Figure 4D:
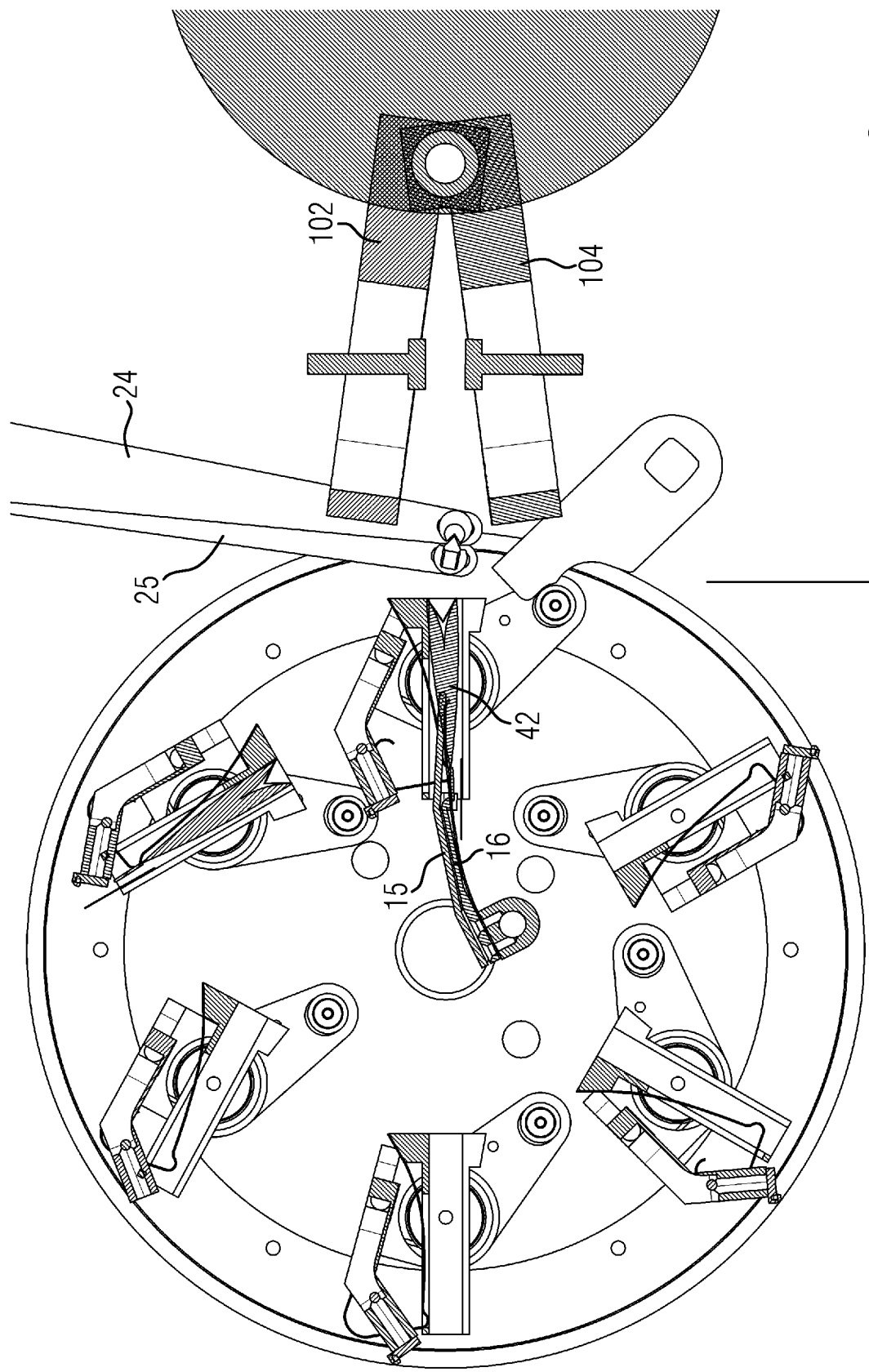

Only in the diagram in FIG. 4d are both components of the packaging unit to be produced, consisting of film 40 and pouch 42, moved simultaneously between sealing jaws 102, 104. These now enclose the movement path B between them. FIG. 4a shows the beginning of the movement of the pouch 42 on the movement path B.

Figure 4E:
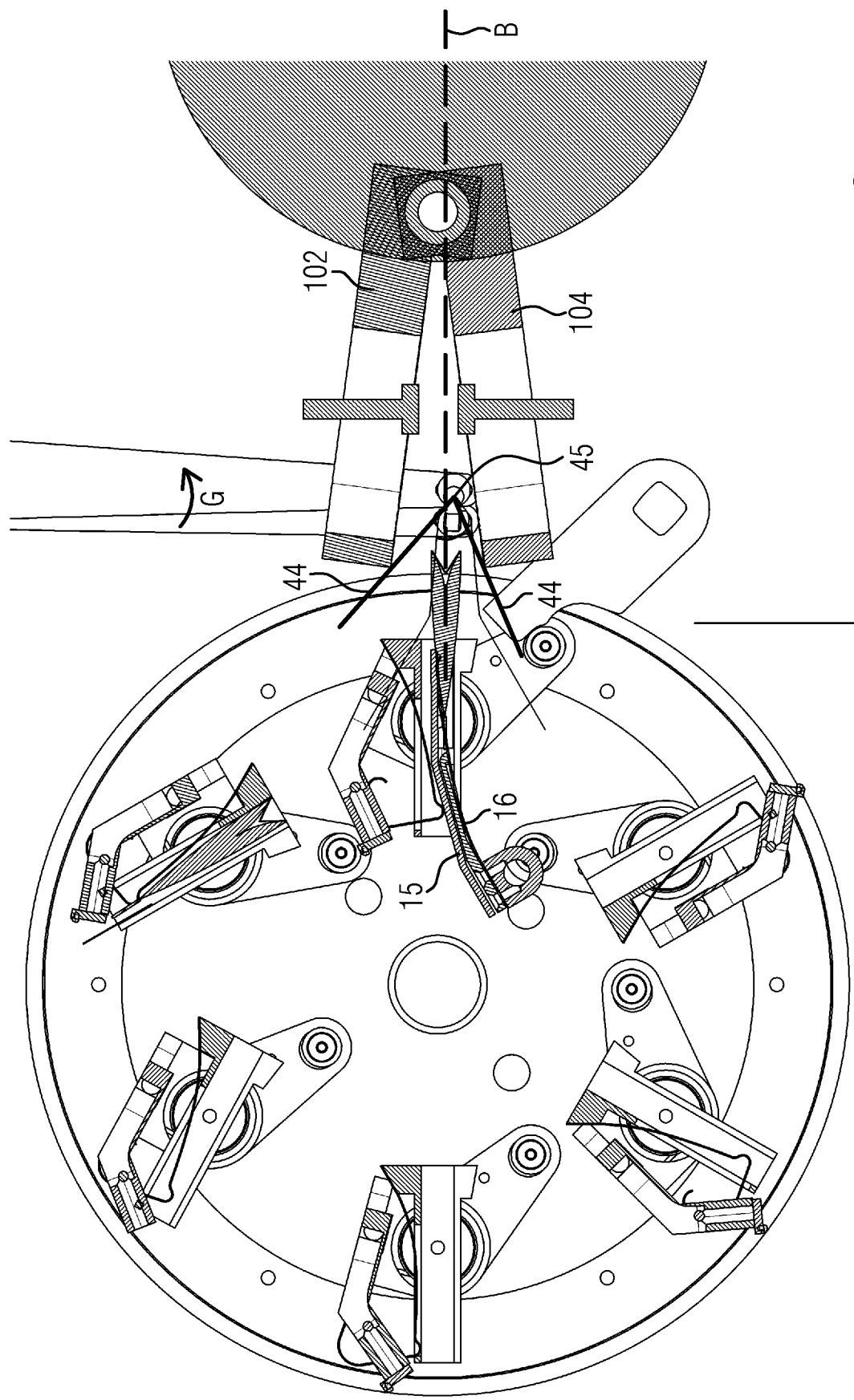

As can be seen from FIG. 4e, the film 40 has been wrapped in a U-shape, whereby two opposing legs 44 of the film 40 are formed between a fold 45, which are progressively brought closer to the pouch 42 with increasing approach, that is, with the insertion movement of the film 40 and the pouch 42 between the sealing jaws 102, 104. The clamping spring 16 has released the pouch 42. A guide holding the film 40 during gripping by the film handling device 20 at the edges and not shown in the drawing, which extends tangentially to the pouch making device 2, is recessed in the middle so that the clamping projections 26, 27 can grip the film 40. The guide also holds funnel-shaped forming elements tapering towards the sealing station 100, which interact with the film 40 to pivot the opposite legs 44 around the fold 45.

Figure 4F:
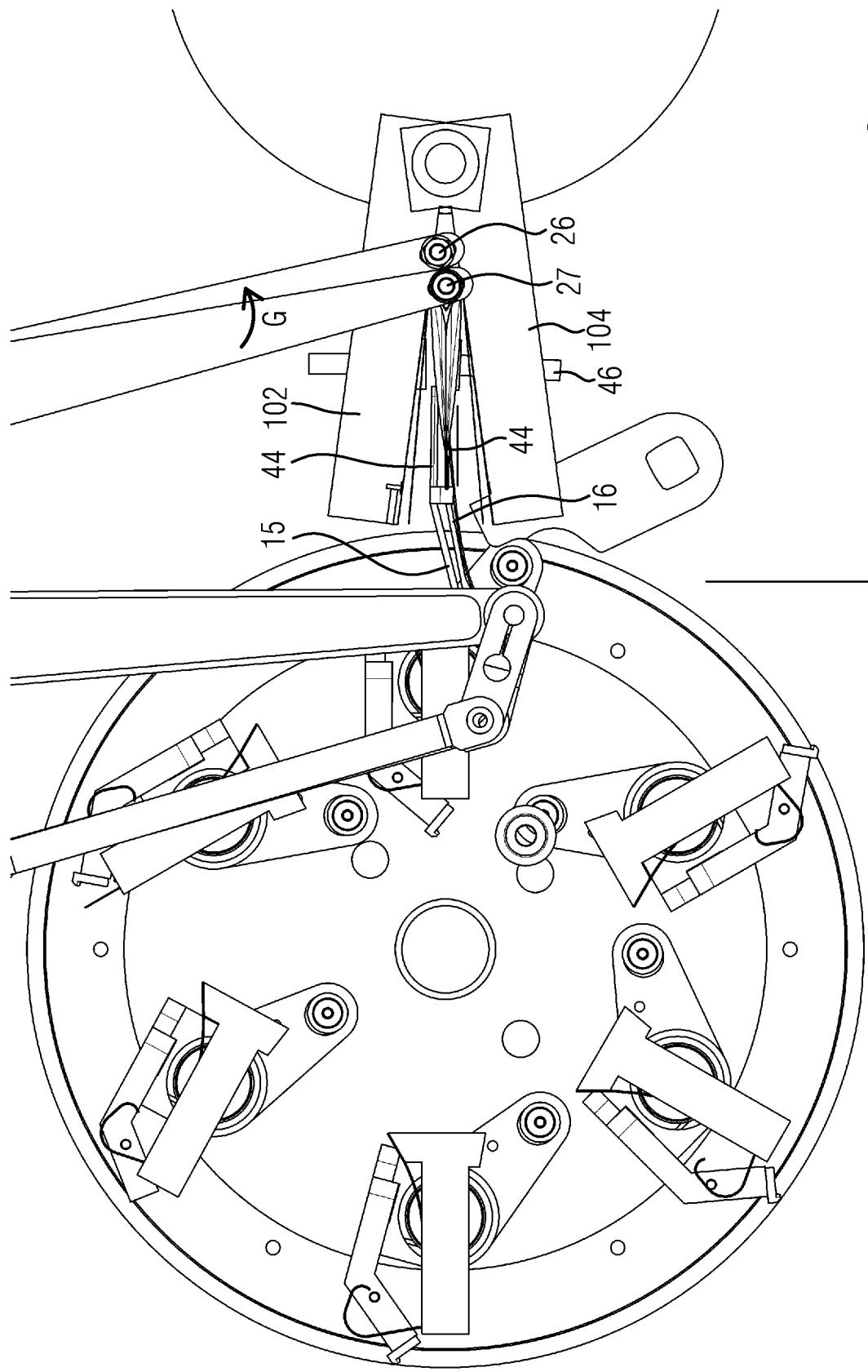

FIG. 4f shows the end position of the pouch handling device 10 and the film handling device 20. In the position shown in FIG. 4f, the film 40 and the pouch 42 have been placed in their sealed position between the two sealing jaws 102, 104.

Figure 4G:
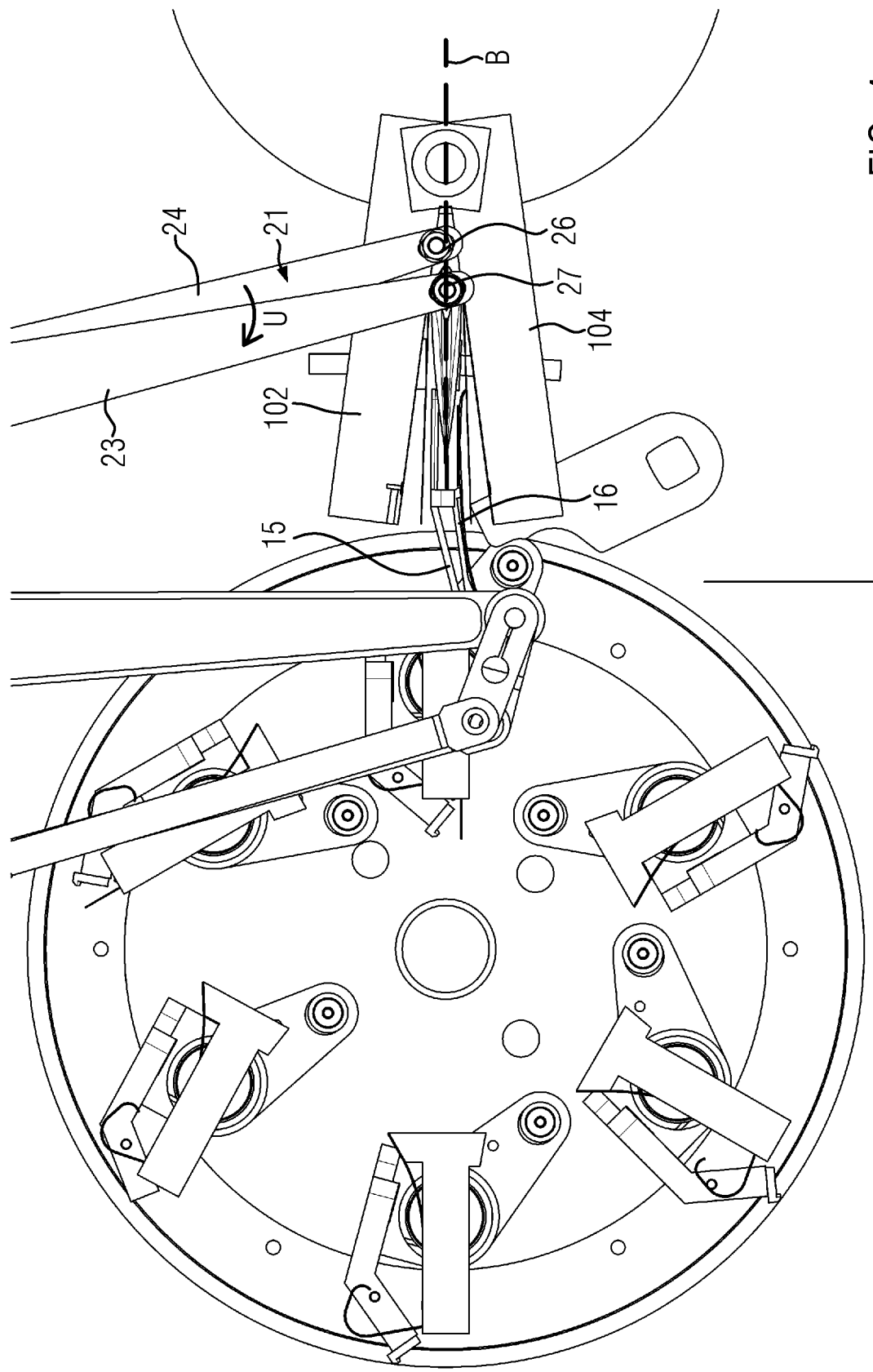
Figure 4H:
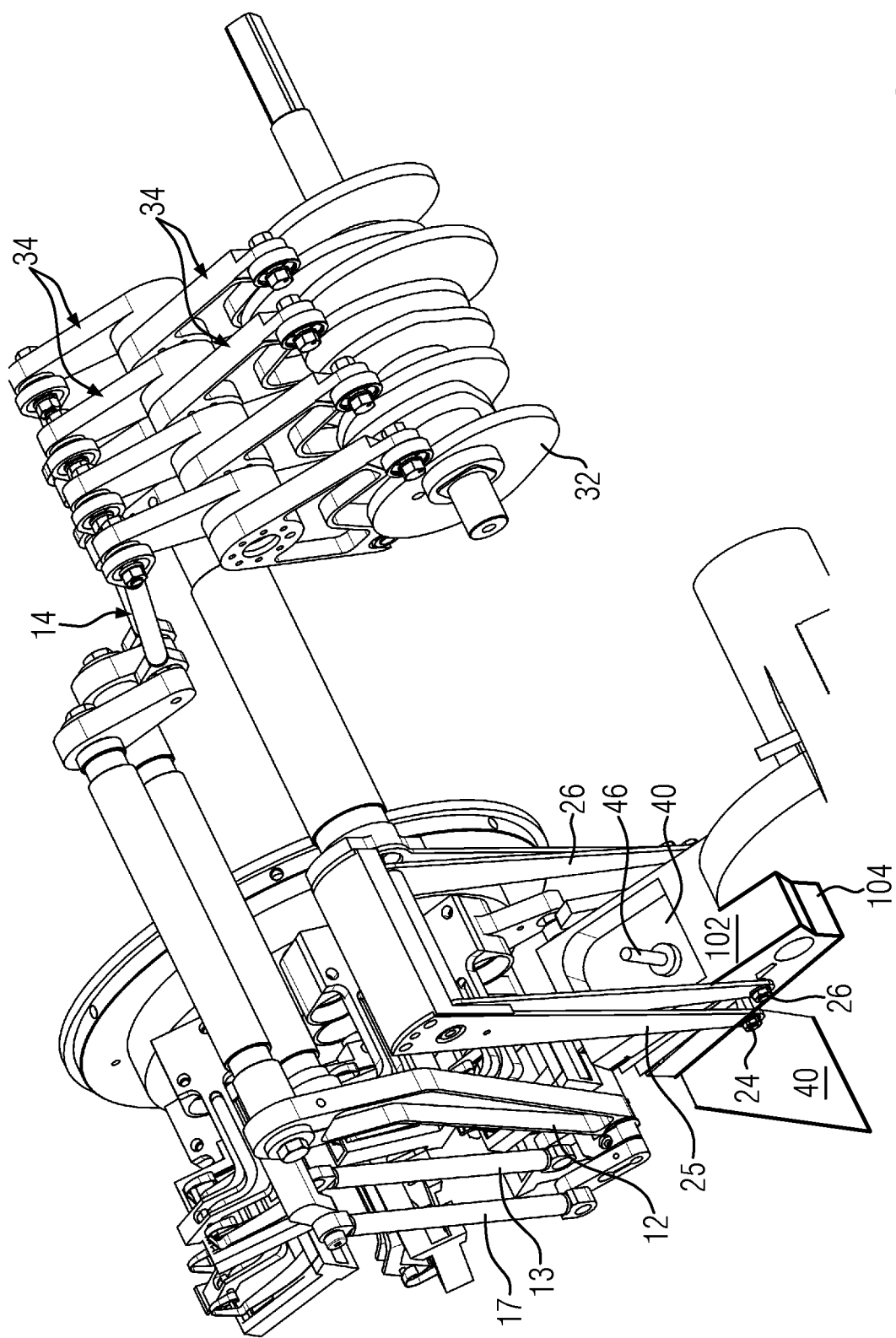

Now the pouch handling device 10 is pivoted in the opposite direction, that is, in clockwise direction U according to the illustration in FIG. 4g. The leading film handling element 21 remains stationary, whereas the trailing film handling element 22, like the pouch handling device 10, is pivoted clockwise to remove the trailing clamping projection 27 from the area between the sealing jaws 102, 104. At about the same time, a clamping device 46, which can be clearly seen especially in FIG. 4h, and which is provided for each of the sealing jaws 102, 104, grips from the outside against the legs 44 and clamps the film 40 and the pouch 42 to the extent that the clamping shoe 15 and the clamping spring 16, which have previously been actuated to release the clamping of the film 40 and the pouch 42, are removed from the sealing jaws 102, 104. The clamping device 46 presently is configured in the form of a clamping punch which is provided to be relatively movable, e.g. pivotable, relative to the associated sealing jaw 102, 104.

Figure 4I:
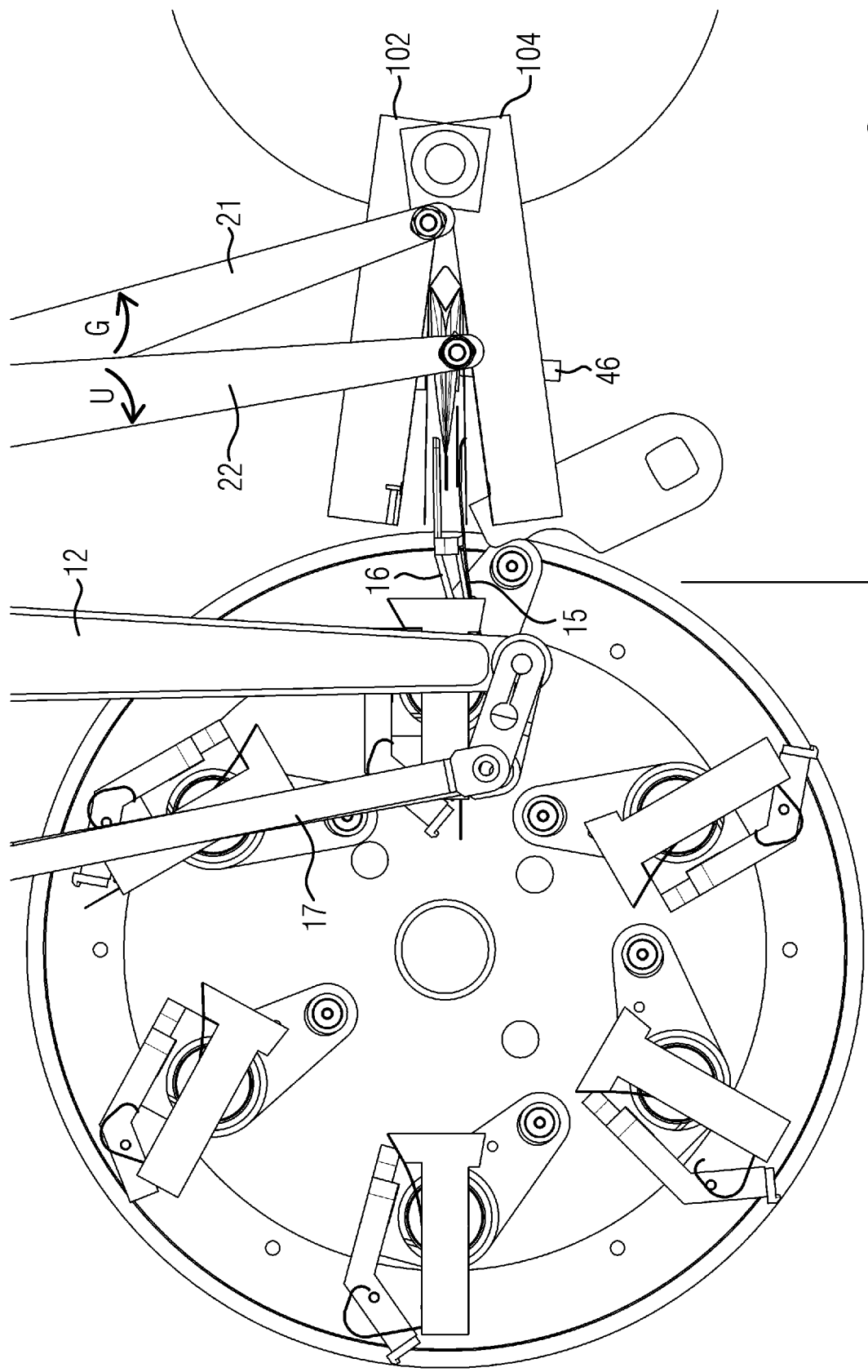
Figure 4J:
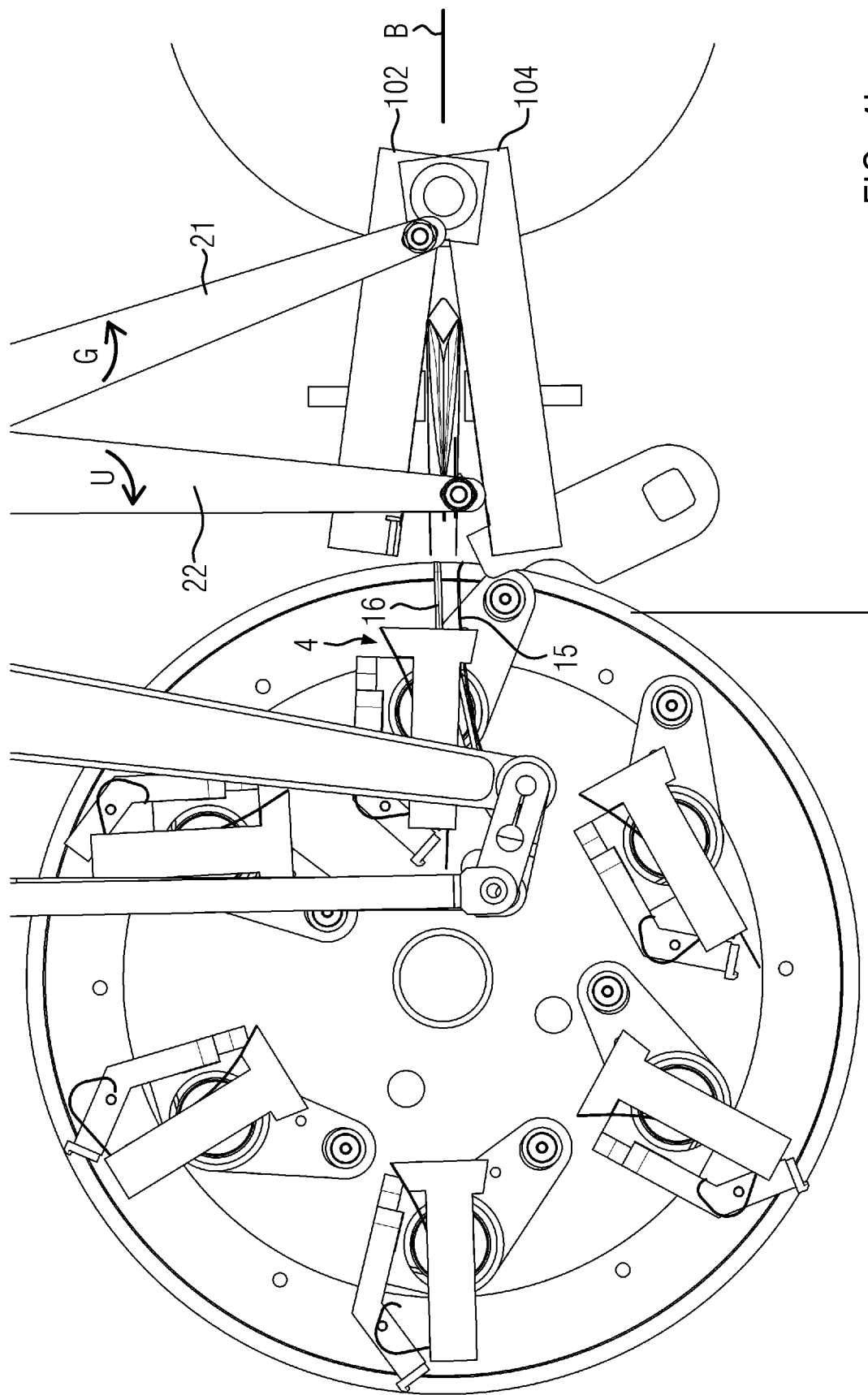

After the clamping shoe 15 and the clamping spring 16 have released the pouch 42 and the leading and trailing clamping projections 26, 27 have released the film 40, the film 40 and the pouch 42 are held between the sealing jaws 102, 104 by the clamping device 46 alone, as illustrated in FIG. 4i. With an increasing pivoting movement of the trailing film handling element 22, the leading film handling element 21 is pivoted counter-clockwise G and thus led out of the area of the sealing jaws 102, 104, which are configured narrower in their rear area so that the leading clamping projections 26 of the leading film handling element 21 can be led out of the area between the sealing jaws 102, 104 by this pivoting movement.

Due to relative pivoting of the leading and trailing pouch handling arms 12, 13, when the clamping shoe 15 and the clamping spring 16 are pivoted back, the position is below the receptacle 4 in position VI. In other words, the clamping shoe 15 and the clamping spring 16 are not returned on the movement path B (see FIG. 4*j*).

Figure 4K:
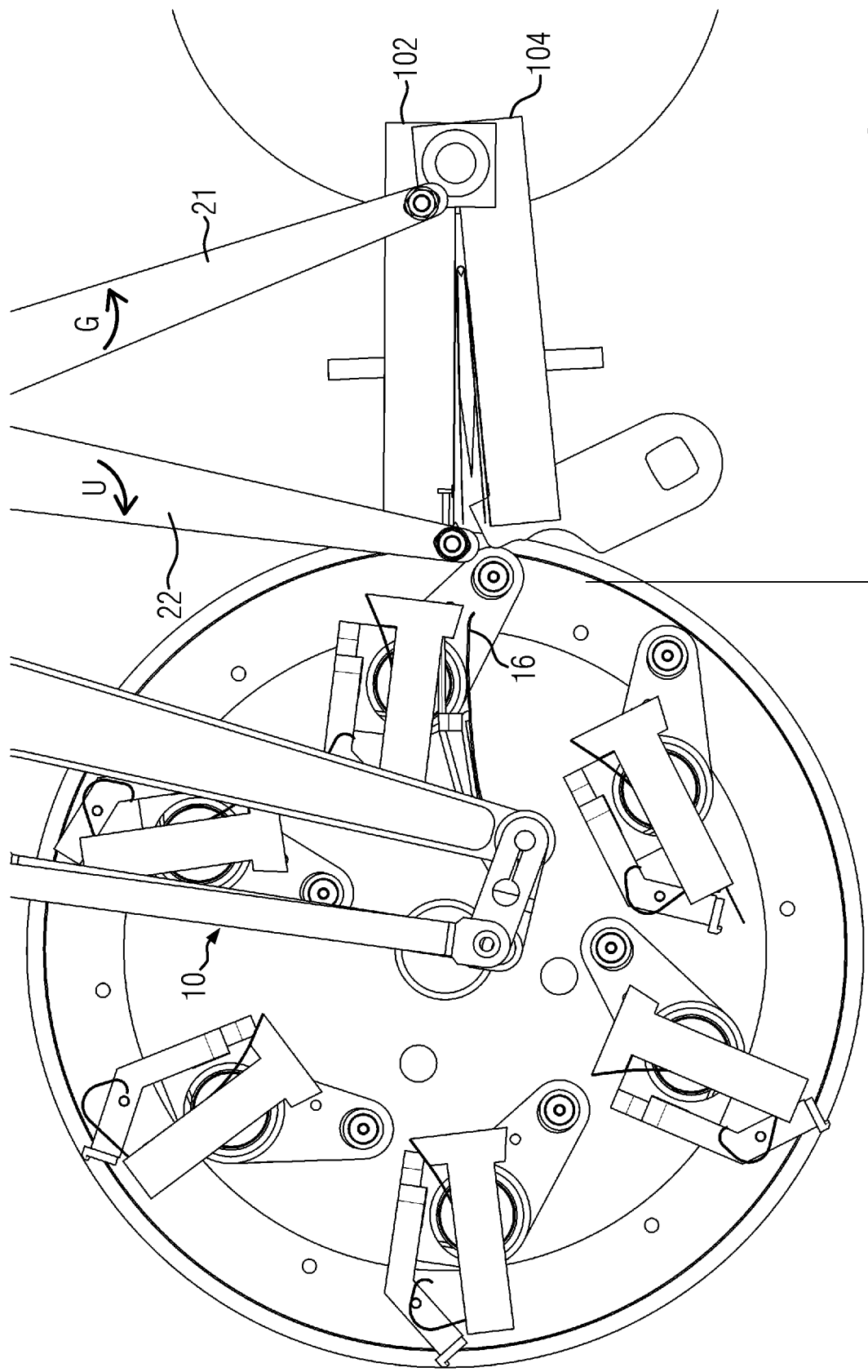
Figure 41:
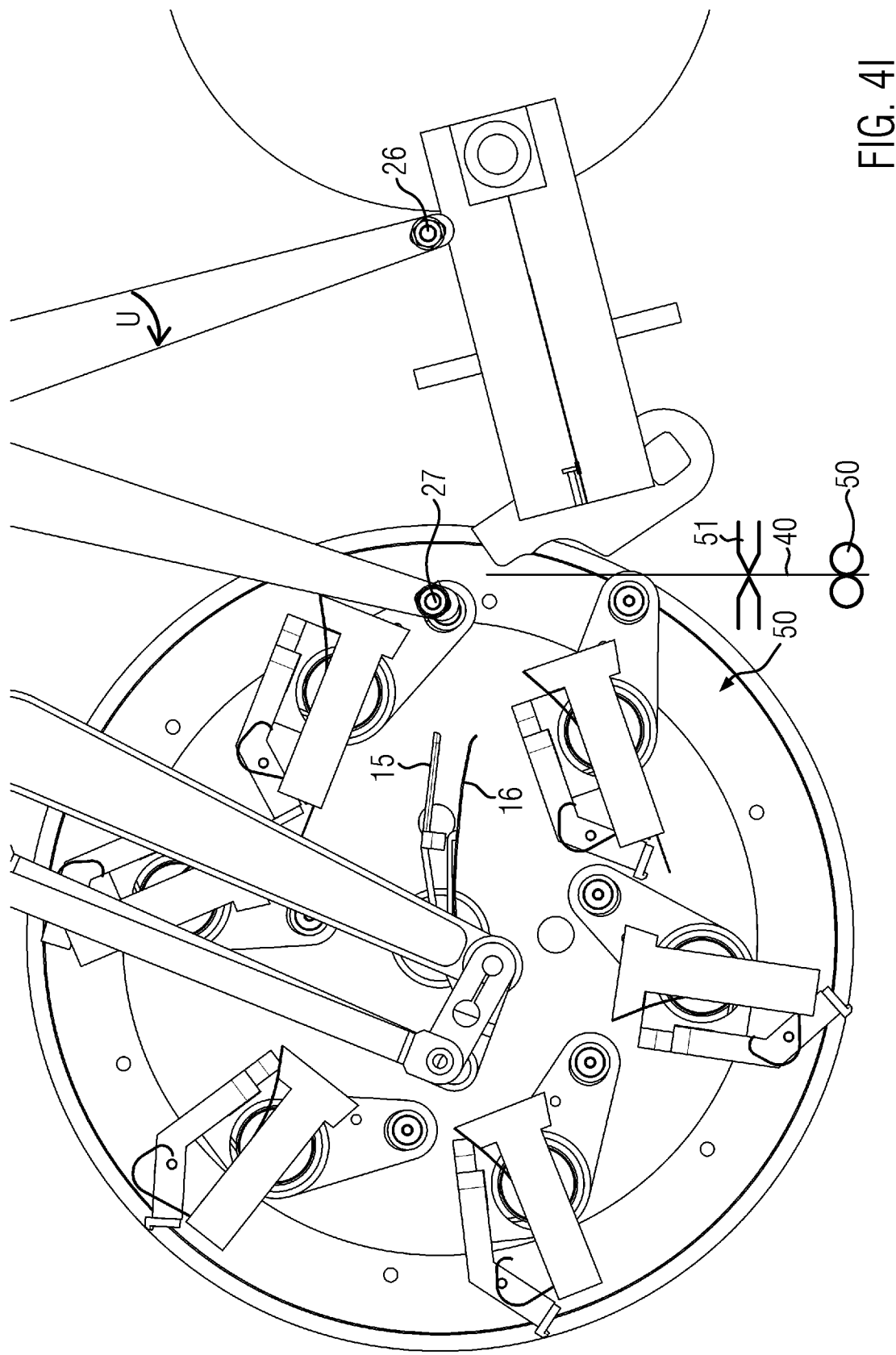
Figure 4M:
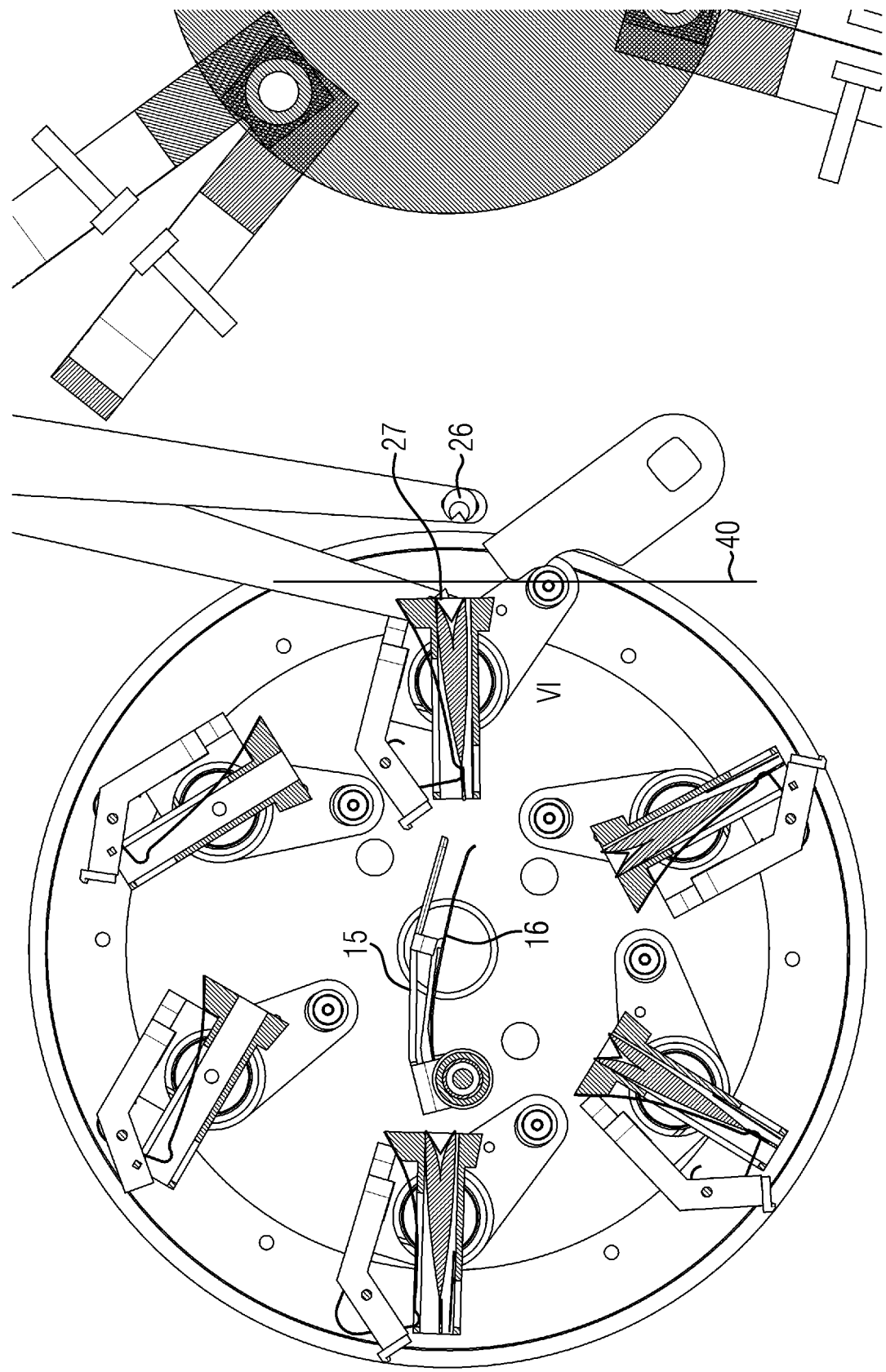

In FIG. 4*k*, the two sealing jaws 102, 104 have already been pivoted towards each other. Accordingly, the distance between the two sealing jaws 102, 104 is smaller than in the diagram in FIG. 4*j*.

Figure 4N:
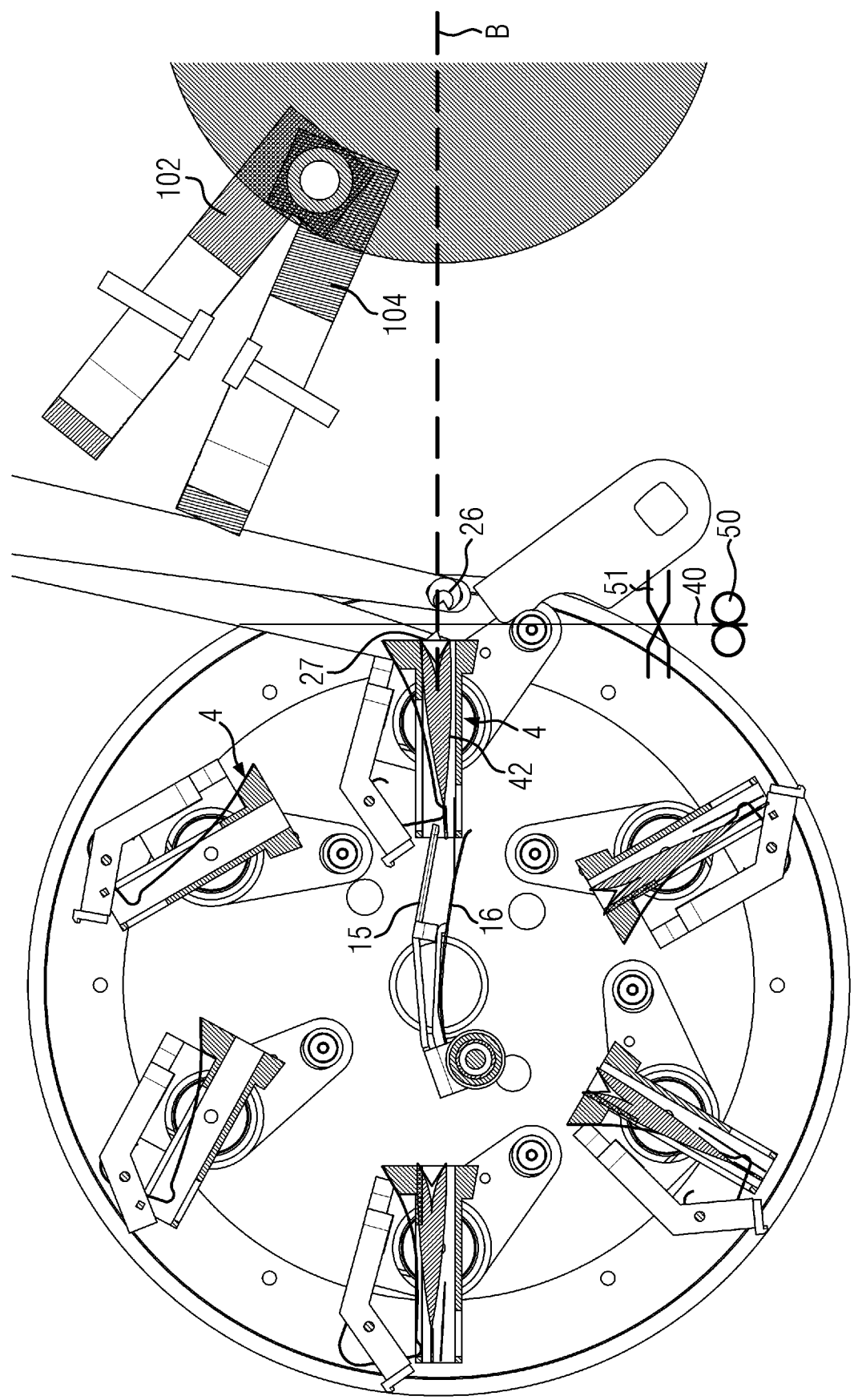

Between FIGS. 4*k* and 4*l*, both the carousel of the pouch making device 2 and the sealing station 100 were pivoted counterclockwise. The sealing jaws 102, 104 are moved completely towards each other during this rotation. After moving the sealing jaws 102, 104 to the sealing position shown in FIG. 4*l*, the clamping devices 46 are released. In the sealing position, the edges of the film 40 that project beyond the pouch 42 laterally and at the front are clamped between the sealing jaws 102, 104 and are heat-sealed with one another. While the sealing position 100 is rotated, a new film 40 is fed between the leading clamping projection 26 and the trailing clamping projection 27 by a film feeding device 50 shown in FIGS. l and n by two drive rollers which clamp and advance the film 40 and to which a cutting device 51 is assigned (see FIGS. 4*l*, 4*m*). By rotating the carousel of the pouch making device 2, the next receptacle 4 was moved clockwise to position VI. FIG. 4*n* already shows the approach of the open clamping spring 16 with the clamping shoe 15 towards the pouch 42 and the approach of the leading and trailing clamping projections 26, 27 to clamp a central area of the film 40, which is located on the movement path B. Meanwhile, the sealing station 100 rotates and brings another set of first and second sealing jaws 102, 104 to enclose the movement path B and accordingly opposite to the receptacle 4. The cycle described above starts again. The cutting device 51 separates a length piece of the film 40 from a supply when the clamping projections 26, 27 grip the film 40.

In the following, the embodiment of the sealing station 100 according to the configuration of the present invention is explained in more detail with reference to FIG. 5 et seq.

Figure 5:
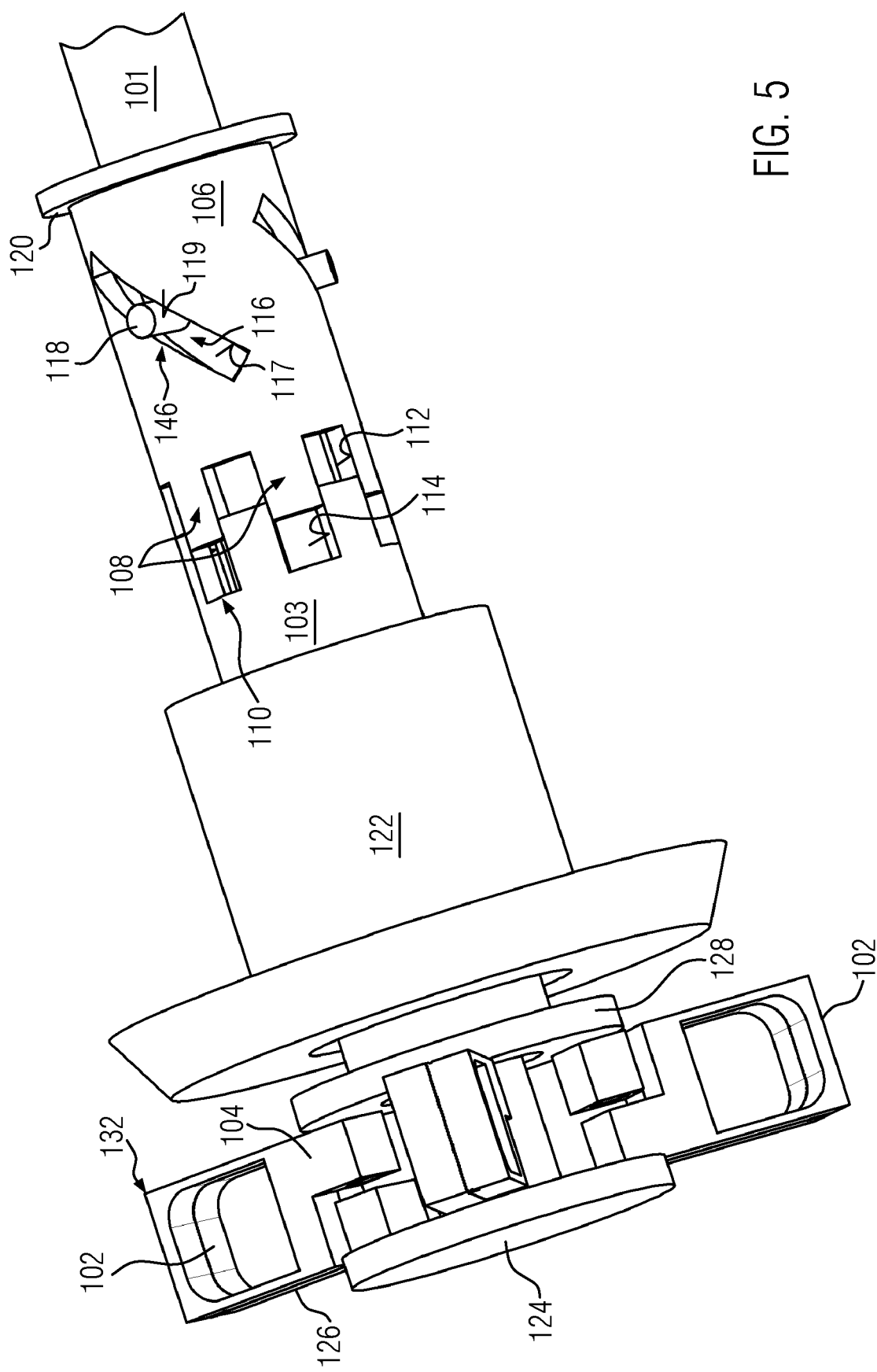
FIG. 5 shows a perspective side view of an embodiment of the sealing station in a first position.

FIG. 5 shows a perspective side view of the embodiment comprising a first shaft 101 associated with a first sealing jaw 102 and a second shaft 103 which is coaxial with the first shaft 101 and associated with the second sealing jaw 104. A sliding sleeve 106 is provided slidably on the first shaft 101, which is engaged via form-fitting elements 108 with associated form-fitting counter-elements 110, which are provided at a front end of the second shaft 103.

The form-fitting elements 108 form guide surfaces 112 extending in purely axial direction in relation to the shafts 101, 103. Correspondingly, the second shaft 103 with its form-fitting counter elements 110 forms corresponding guide surfaces 114.

The sliding sleeve 106 has an inclined slot 116 which penetrates its circumferential surface, extends obliquely relative to the axial extension of the first or second shaft 101, 103, forms a correspondingly inclined guide surface 117 and is penetrated by a guide pin 118 which is held in the guide slot 116 and forms with its outer circumferential surface a further guide surface 119 which cooperates with the guide surface 117.

At its end opposite the form-fitting element 108, the sliding sleeve 106 has a drive ring 120 which cooperates with a slider 121 shown in FIGS. 6 and 7, the operation of which is explained in more detail below.

The first and second shafts 101, 103 each pass through a bearing sleeve 122 for positioning the shafts 101, 103 on a gearbox housing 123. The first shaft 101 has a first turntable 124 at its free end, on the outer circumference of which several of the first sealing jaws 102 are mounted at an even distance from each other. The first sealing jaws 102 are mounted essentially non-rotatably on the first turntable 124.

In a corresponding manner, the second shaft 103 has a second turntable 128, on which several of the second sealing jaws 104 are mounted non-rotatably. For this purpose, the second sealing jaws 104 are screwed to the second turntable 128. By loosening the screw connection, the alignment of the second sealing jaw 104 relative to the second turntable 128 can be adjusted. This allows the embodiment to be adjusted so that, with a sealing position as shown in FIG. 5, all first sealing jaws 102 are in contact with the associated second sealing jaws 104 in order to clamp the film 40 provided between them and forming the film package and seal it via a U-shaped seam.

The sealing jaws 102, 104 are presently sealing jaws which are heated by a heater provided inside the sealing jaws 102, 104 and form a sealing element 132.

Figure 6:
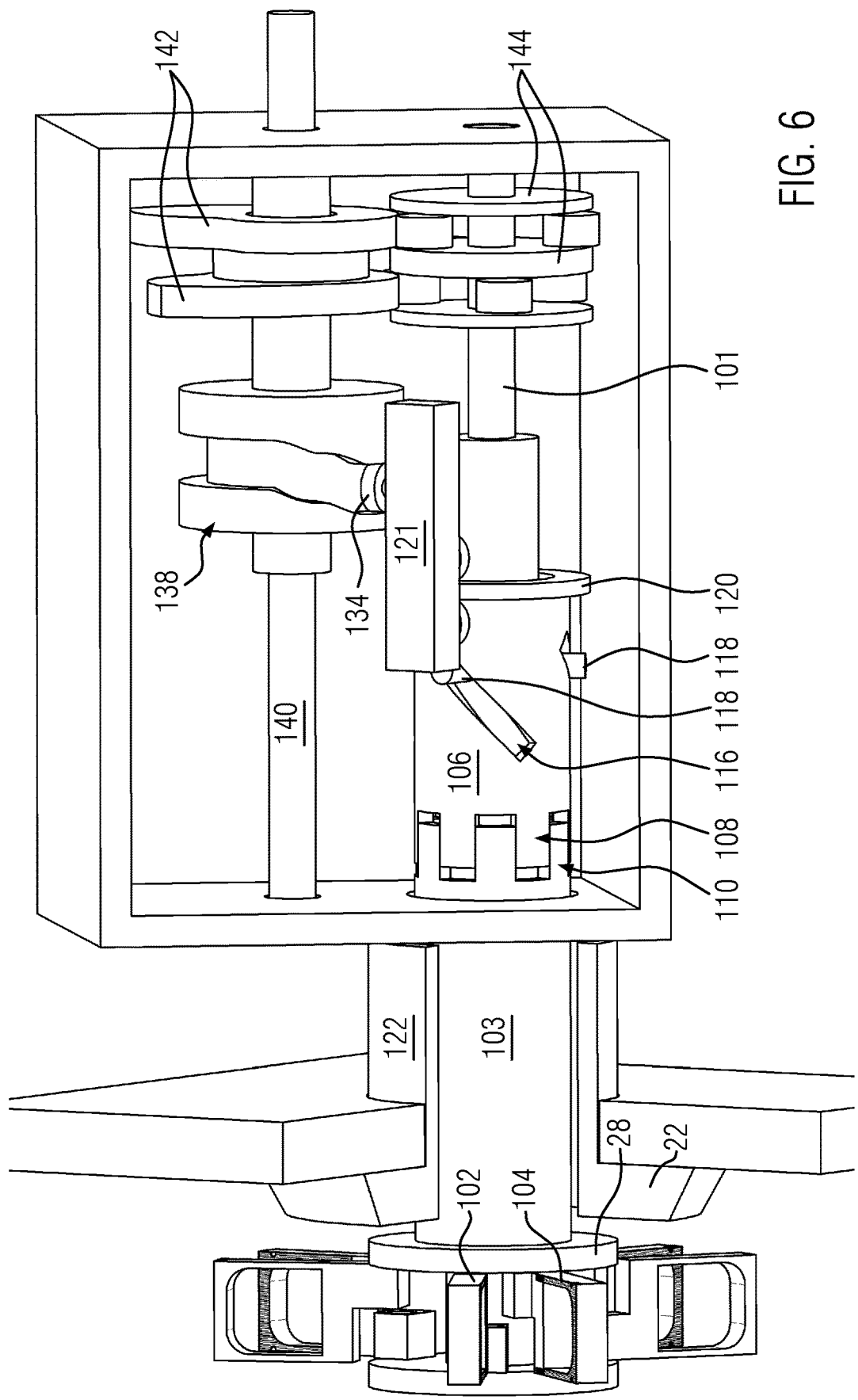
FIG. 6 shows a side view of the embodiment according to FIG. 5 with further details of the embodiment in a second position.
Figure 7:
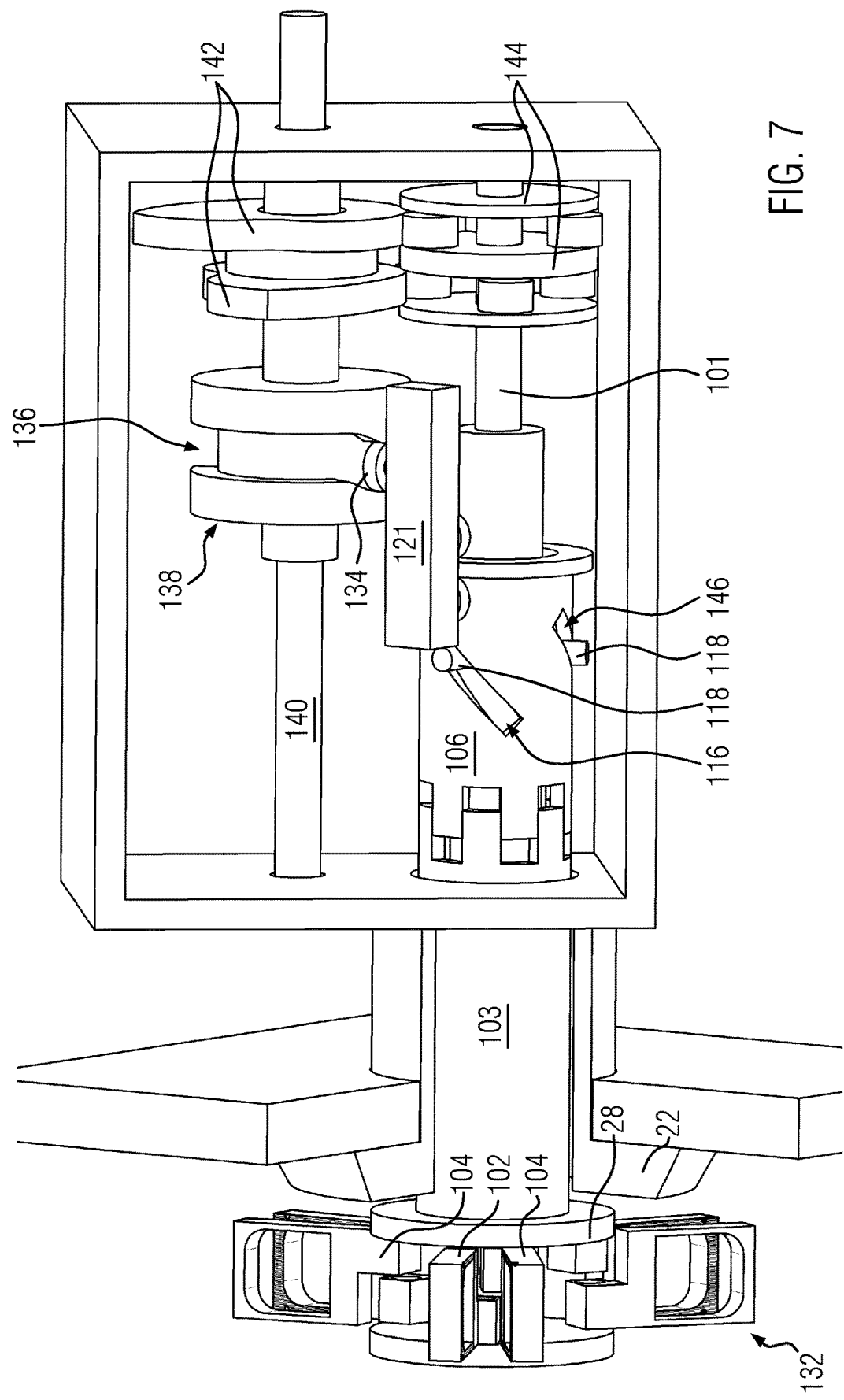
FIG. 7 shows a side view according to FIG. 6 in a third position.

As can be derived from FIGS. 6 and 7, the slide 121 interacts via a guide roller 134 with a slotted guide 136 which is configured as a groove 136 and is provided on a guide cylinder 138. The guide cylinder 138 is non-rotatably connected to a drive shaft 140, which also rotates two cam discs 142, whose cams engage in recesses of output discs 144 for stepwise drive of the first and second shafts 101, 103.

Thus the drive shaft 140 is moved continuously, whereas the shafts 101, 103 on the one hand are rotated relative to each other and overall in steps around a common rotation axis.

Between the first and second sealing jaws 102, 104, a pretensioning agent can act in order to apply the corresponding sealing jaws 102, 104 against each other under elastic pretension and intermediate layer of the film 40. Any tolerance errors are compensated by this elastic means. For example, the elastic means can elastically support at least one of the sealing jaws 102, 104. Alternatively, the second shaft 103, for example, can also be made of a torsionally elastic material.

In FIGS. 5 to 7, it has been dispensed with the illustration of the separate clamping device 46.

With the selected drive type, the first shaft 101 is driven directly via the output discs 144, while the sliding sleeve 106 is driven by the interaction of the guide pin 118 with the inclined slot 116 and, due to the position of the sleeve 106, via the slider 121. By decoupling the drive movement of the drive shaft 140 due to the cam discs 142 on the one hand and the guide cylinder 138 on the other hand, a relative movement of the sealing jaws 102, 104 can result even with the stopped first shaft 101. The sequence between the insertion of the film 40 together with the pouch 42, the closing of the two sealing jaws 102, 104, and the sealing of the pouch 42 between the film 40 results from the sequence of FIGS. 6, 7 and 5.

Between FIGS. 6 and 7, the sealing position is prepared with the stopped first shaft 101 and relative movement of the sliding sleeve 106. The sealing jaws 102, 104 are applied against each other. The first sealing jaw 102 remains stationary, whereas the second sealing jaw 104 is pivoted by actuating the sliding sleeve 106. After the two sealing jaws 102, 104 have been placed against each other, the first and the second shaft 101, 103 pivot simultaneously. The position of the sliding sleeve 106 relative to the second shaft 103 remains unchanged. The guide pin 118, which is non-rotatably connected to the first shaft 101, takes the sliding sleeve 106 with it so that the second sealing jaws 104 are also pivoted.

The inclined slot 116 and the guide pin 118 form an inclined guide 146, which realizes a positive guide that couples the two shafts 101, 103 with predetermined kinematics.

As an alternative to the embodiment shown, a drive with cam discs and output discs can also be assigned to the second shaft 103, as in the embodiment shown for the first shaft 101. In this case, too, an independent drive for the second sealing jaws 104 can be realized which is predetermined by the rotation of the drive shaft 140. But even with this positive guidance, the first and second sealing jaws 102, 104 are driven and positively coupled by the drive shaft 140 alone.

REFERENCE SIGNS LIST 2 pouch making device
4 receptacle
10 pouch handling device
12 leading pouch handling arm
13 trailing pouch handling arm
14 coupling rod
15 clamping shoe
16 clamping spring
17 actuating arm
20 film handling device
21 leading film handling element
22 trailing film handling element
24 leading handling arm
25 trailing handling arm
26 leading clamping projection
27 trailing clamping projection
30 drive device
32 cam
33 drive shaft
34 collector
36 bearing axis
37 lever
40 film
42 pouch
44 leg
45 fold
46 clamping device
50 film feeding device
51 cutting device
B movement path
U pivoting in clockwise direction
G pivoting in counter-clockwise direction
I-VI position of receptacle 4
100 sealing station
101 first shaft
102 first sealing jaw
103 second shaft
104 second sealing jaw
106 sliding sleeve
108 form-fitting elements
110 form-fitting counter elements
112 guide surface
114 guide surface
116 inclined slot
117 guide surface of the inclined slot
118 guide pin
119 guide surface of the guide pin
120 drive ring
121 slider
122 bearing sleeve
123 gearbox housing
124 first turntable
128 second turntable
132 sealing element
134 guide roller
136 groove
138 guide cylinder
140 drive shaft
142 cam disc
144 output disc
146 inclined guide

What is claimed is:

1. A device for making a pouch received in a wrapping, comprising a pouch making device which is adapted to produce a pouch containing brewable material in a water-permeable wrapping, and comprising a sealing station with two sealing jaws movable relative to each other for sealing the pouch in a wrapping formed by a wrapping material, further comprising a pouch handling device for removing the finished pouch from the pouch making device and a wrapping material handling device for handling the wrapping material during the wrapping of the wrapping material, wherein the pouch handling device and the wrapping material handling device are adapted such that the pouch held by pouch handling device and the wrapping material held by the wrapping material handling device are introduced into the sealing station.

2. The device according to claim 1, further comprising a wrapping material feeding device which holds a length piece of wrapping material between the finished pouch located in the pouch making device and the sealing station.

3. The device according to claim 1, further comprising a clamping device associated with the sealing station which holds the pouch together with the wrapping enclosing the pouch between the jaws of the sealing station prior to closing the jaws.

4. The device according to claim 1, wherein the two sealing jaws is a plurality of two sealing jaws and further comprising a first shaft which carries a plurality of first sealing jaws of the plurality of two sealing jaws and a second shaft which carries a plurality of second sealing jaws of the plurality of two sealing jaws, each one of said plurality of second sealing jaws cooperating with a respective one of said plurality of first sealing jaws during sealing of the film wrapping, and in that the first and second shafts have a common rotational axis and are movable relative to one another in order to space apart the sealing jaws for accommodating the pouch and the film and to apply them to one another for sealing the film.

5. The device according to claim 4, wherein the sealing jaws are substantially rigidly attached to the associated shaft.

6. The device according to claim 4, wherein at least one of the sealing jaws is elastically supported when the sealing jaws are applied and holds the sealing jaws against each other.

7. The device according to claim 4, characterized in that the two shafts are driven via a common drive shaft.

8. The device according to claim 4, characterized in that the two shafts are coupled via an inclined guide.

* * * * *